United States Patent
Puglia

(10) Patent No.: US 10,473,784 B2
(45) Date of Patent: Nov. 12, 2019

(54) DIRECT DETECTION LIDAR SYSTEM AND METHOD WITH STEP FREQUENCY MODULATION (FM) PULSE-BURST ENVELOPE MODULATION TRANSMISSION AND QUADRATURE DEMODULATION

(71) Applicant: Veoneer US, Inc., Southfield, MI (US)

(72) Inventor: Kenneth V. Puglia, Westford, MA (US)

(73) Assignee: Veoneer US, Inc., Southfield, MI (US)

( * ) Notice: Subject to any disclaimer, the term of this patent is extended or adjusted under 35 U.S.C. 154(b) by 408 days.

(21) Appl. No.: 15/410,158

(22) Filed: Jan. 19, 2017

(65) Prior Publication Data

US 2018/0372870 A1 Dec. 27, 2018

Related U.S. Application Data

(60) Provisional application No. 62/340,758, filed on May 24, 2016.

(51) Int. Cl.
*G01C 3/08* (2006.01)
*G01S 17/10* (2006.01)
(Continued)

(52) U.S. Cl.
CPC ............ *G01S 17/102* (2013.01); *G01S 7/484* (2013.01); *G01S 7/487* (2013.01); *G01S 7/4817* (2013.01);
(Continued)

(58) Field of Classification Search
CPC .......... G01S 17/10; G01S 17/42; G01S 17/58; G01S 17/936; G01S 17/102; G01S 7/4865; G01S 7/487; G01S 7/4817; G01S 7/484
(Continued)

(56) References Cited

U.S. PATENT DOCUMENTS

| 3,712,985 A | 1/1973 | Swarner et al. |
| 4,184,154 A | 1/1980 | Albanese et al. |

(Continued)

FOREIGN PATENT DOCUMENTS

| AT | 609180 B1 | 1/2016 |
| DE | 19757840 C1 | 9/1999 |

(Continued)

OTHER PUBLICATIONS

Kasturi et al., UAV-Borne LiDAR with MEMS Mirror Based Scanning Capability; SPIE Defense and Commercial Sensing Conference 2016; Apr. 20, 2016; Baltimore, MD; 10 pages.
(Continued)

*Primary Examiner* — Mark Hellner
(74) *Attorney, Agent, or Firm* — Burns & Levinson, LLP; Steven M. Mills

(57) ABSTRACT

A LiDAR system includes a signal generator for generating an output signal having a variable frequency. A modulation circuit receives the output signal from the signal generator and modulates the output signal to generate a pulsed modulation envelope signal configured to comprise a plurality of pulses, two or more of the plurality of pulses having two or more respective different frequencies. The modulation circuit applies the pulsed modulation envelope signal to an optical signal to generate a pulse-envelope-modulated optical signal comprising a plurality of pulses modulated by the pulsed modulation envelope signal. Optical transmission elements transmit the pulse-envelope-modulated optical signal into a region. Optical receiving elements receive reflected optical signals from the region. Receive signal processing circuitry receives the reflected optical signals and uses quadrature detection to process the reflected optical signals.

12 Claims, 23 Drawing Sheets

(51) Int. Cl.
*G01S 17/42* (2006.01)
*G01S 17/58* (2006.01)
*G01S 17/93* (2006.01)
*G01S 7/484* (2006.01)
*G01S 7/486* (2006.01)
*G01S 7/487* (2006.01)
*G01S 7/481* (2006.01)

(52) U.S. Cl.
CPC ............ *G01S 7/4865* (2013.01); *G01S 17/10* (2013.01); *G01S 17/42* (2013.01); *G01S 17/58* (2013.01); *G01S 17/936* (2013.01)

(58) Field of Classification Search
USPC ........................................................ 356/5.01
See application file for complete search history.

(56) References Cited

U.S. PATENT DOCUMENTS

| | | | |
|---|---|---|---|
| 4,439,766 | A | 3/1984 | Kobayashi et al. |
| 4,957,362 | A | 9/1990 | Peterson |
| 5,210,586 | A | 5/1993 | Grage et al. |
| 5,274,379 | A | 12/1993 | Carbonneau |
| 5,428,215 | A | 6/1995 | Dubois et al. |
| 5,604,695 | A | 2/1997 | Cantin et al. |
| 5,793,491 | A | 8/1998 | Wangler et al. |
| 5,889,490 | A | 3/1999 | Wachter et al. |
| 5,966,226 | A | 10/1999 | Gerber |
| 6,559,932 | B1 | 5/2003 | Halmos |
| 7,227,116 | B2 | 6/2007 | Gleckler |
| 7,272,271 | B2 | 9/2007 | Kaplan et al. |
| 7,440,084 | B2 | 10/2008 | Kane |
| 7,483,600 | B2 | 1/2009 | Achiam et al. |
| 8,508,723 | B2 * | 8/2013 | Chang ...................... G01S 17/87 356/28 |
| 8,629,975 | B1 | 1/2014 | Dierking et al. |
| 8,742,325 | B1 | 6/2014 | Droz et al. |
| 9,063,549 | B1 | 6/2015 | Pennecot et al. |
| 9,086,273 | B1 | 7/2015 | Gruver et al. |
| 9,090,213 | B2 | 7/2015 | Lawlor et al. |
| 9,097,646 | B1 | 8/2015 | Campbell et al. |
| 9,267,787 | B2 | 2/2016 | Shpunt et al. |
| 9,285,477 | B1 | 3/2016 | Smith et al. |
| 9,575,162 | B2 | 2/2017 | Owechko |
| 9,618,742 | B1 | 4/2017 | Droz et al. |
| 9,869,754 | B1 | 1/2018 | Campbell et al. |
| 2001/0052872 | A1 | 12/2001 | Hahlweg |
| 2004/0135992 | A1 * | 7/2004 | Munro ...................... G01S 7/483 356/4.01 |
| 2006/0221250 | A1 | 10/2006 | Rossbach et al. |
| 2007/0181810 | A1 | 8/2007 | Tan et al. |
| 2008/0088499 | A1 | 4/2008 | Bonthron et al. |
| 2008/0219584 | A1 | 9/2008 | Mullen et al. |
| 2008/0246944 | A1 | 10/2008 | Redman et al. |
| 2009/0002680 | A1 | 1/2009 | Ruff et al. |
| 2009/0010644 | A1 | 1/2009 | Varshneya |
| 2009/0190007 | A1 | 7/2009 | Oggier |
| 2010/0157280 | A1 | 6/2010 | Kusevic et al. |
| 2010/0182874 | A1 | 7/2010 | Frank et al. |
| 2012/0236379 | A1 | 9/2012 | da Silva et al. |
| 2013/0093584 | A1 | 4/2013 | Schumacher |
| 2013/0120760 | A1 | 5/2013 | Raguin et al. |
| 2013/0206967 | A1 | 8/2013 | Shpunt et al. |
| 2013/0207970 | A1 | 8/2013 | Shpunt et al. |
| 2014/0036252 | A1 | 2/2014 | Amzajerdian et al. |
| 2014/0152975 | A1 | 6/2014 | Ko |
| 2015/0260843 | A1 | 9/2015 | Lewis |
| 2015/0371074 | A1 | 12/2015 | Lin |
| 2015/0378011 | A1 | 12/2015 | Owechko |
| 2016/0047895 | A1 * | 2/2016 | Dussan .................. G01S 7/484 356/4.01 |
| 2016/0178749 | A1 | 6/2016 | Lin et al. |
| 2016/0245902 | A1 | 8/2016 | Watnik et al. |
| 2016/0291160 | A1 | 10/2016 | Zweigle et al. |
| 2016/0363669 | A1 | 12/2016 | Liu |
| 2016/0380488 | A1 | 12/2016 | Widmer |
| 2017/0090013 | A1 | 3/2017 | Paradie et al. |
| 2017/0269215 | A1 | 9/2017 | Hall et al. |
| 2018/0241477 | A1 | 8/2018 | Turbide et al. |

FOREIGN PATENT DOCUMENTS

| | | |
|---|---|---|
| DE | 102004033944 A1 | 2/2006 |
| DE | 102006031114 A1 | 1/2008 |
| DE | 102015217908 A1 | 3/2017 |
| EP | 0112188 A2 | 6/1984 |
| EP | 0578129 A2 | 1/1994 |
| EP | 2696166 A2 | 2/2014 |
| EP | 2824418 | 1/2015 |
| EP | 3147685 A1 | 3/2017 |
| EP | 3203259 A1 | 8/2017 |
| WO | 1994019705 A1 | 9/1994 |
| WO | 2008/008970 A2 | 1/2008 |
| WO | 2015/014556 A2 | 2/2015 |
| WO | 2016/097409 A2 | 6/2016 |

OTHER PUBLICATIONS

Internet URL: https://www.continental-automotive.com/en-gl/Passenger-Cars/Chassis-Safety/Advanced-Driver-Assistance-Systems/Cameras [retrieved on Dec. 20, 2018].

Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].

Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airborne-Laser-Scanning-in-a-Kinematical-Framework.pdf.

Internet URL: http://www.advancedscientificconcepts.com/products/overview.html [retrieved on Dec. 20, 2018].

Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.

A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.

Hewlett-Packard Application Note 77-4, Swept-Frequency Group Delay Measurements, Hewlett-Packard Co., Sep. 1968, 7 pages.

Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.

Journet et al., A Low-Cost Laser Range Finder Based on an FMCW-like Method, IEEE Transactions on Instrumentation and Measurement, Aug. 2000, vol. 49, No. 4, pp. 840-843.

Campbell et al., Advanced Sine Wave Modulation of Continuous Wave Laser System for Atmospheric CO2 Differential Absorption Measurements; NASA Langley Research Center; 32 pages [retrieved on Dec. 20, 2018].

Levanon et al., Non-coherent Pulse Compression—Aperiodic and Periodic Waveforms; The Institution of Engineering and Technology, 2015; 9 pages.

Peer et al., Compression Waveforms for Non-Coherent Radar, Tel Aviv University; 6 pages [retrieved on Dec. 20, 2018].

Li, Larry, Time-of-Flight Camera—An Introduction, Technical White Paper, SLOA190B, Texas Instruments; Jan. 2014; 10 pages.

Pierrottet et al., Linear FMCW Laser Radar for Precision Range and Vector Velocity Measurements, Coherent Applications, Inc.; NASA Langley Research Center; 9 pages [retrieved on Dec. 20, 2018].

(56) References Cited

OTHER PUBLICATIONS

Kahn, Joseph M., Modulation and Detection Techniques for Optical Communication Systems, Stanford University, Department of Electrical Engineering, 2006; 3 pages.

Niclass et al., Development of Automotive LIDAR, Electronics and Communications in Japan, vol. 98, No. 5, 2015; 6 pages.

Su et al, 2-D FFT and Time-Frequency Analysis Techniques for Multi-Target Recognition of FMCW Radar Signal, Proceedings of the Asia-Pacific Microwave Conference 2011, pp. 1390-1393.

Wojtkiewicz et al, Two-Dimensional Signal Processing in FMCW Radars, Instytut Podstaw Elektroniki Politechnika Warszawska, Warszawa; 6 pages[retreived on Dec. 20, 2018].

Winkler, Volker, Range Doppler Detection for Automotive FMCW Radars, Proceedings of the 4th European Radar Conference, Oct. 2007, Munich Germany; 4 pages.

Li et al., Investigation of Beam Steering Performances in Rotation Risley-Prism Scanner, Optics Express, Jun. 13, 2016, vol. 24, No. 12; 11 pages.

Thorlabs Application Note, Risley Prism Scanner; 33 pages [retrieved on Dec. 20, 2018].

Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.

International Search Report and Written Opinion in corresponding International Application No. PCT/US2017/033263, dated Aug. 29, 2017; 13 pages.

International Search Report and Written Opinion in corresponding International Application No. PCT/US2017/033265, dated Sep. 1, 2017; 15 pages.

International Search Report and Written Opinion in corresponding International Application No. PCT/US2018/054992, dated Dec. 11, 2018; 12 pages.

International Search Report and Written Opinion in corresponding International Application No. PCT/US2018/049038, dated Dec. 12, 2018; 13 pages.

International Search Report and Written Opinion in corresponding International Application No. PCT/US2018/057727, dated Jan. 28, 2019; 12 pages.

International Search Report and Written Opinion in corresponding International Application No. PCT/US2018/052837, dated Jan. 24, 2019; 13 pages.

Skolnik, M.I., Introduction to Radar Systems, 3rd Edition, pp. 45-48, McGraw-Hill, New York, NY 2001; 6 pages.

Range-Doppler image processing in linear FMCW Radar and FPGA Based Real-Time Implementation, Journal of Communication and Computer, vol. 6, No. 4, Apr. 2009.

Invitation to Pay Additional Fees dated Mar. 8, 2019 in PCT/US2018/052849.

International Search Report and Written Opinion in corresponding PCT Application No. PCT/US2017/033271, International Filing Date May 18, 2017; dated Sep. 1, 2017.

International Search Report and Written Opinion in corresponding International Application No. PCT/US2018/048869, dated Nov. 8, 2018; 14 pages.

International Search Report and Written Opinion in corresponding International Application No. PCT/US2018/051281, dated Nov. 22, 2018; 14 pages.

* cited by examiner

| Parameter | Symbol | Value | Units | Note/Comment |
|---|---|---|---|---|
| Frequency Step Increment | $\Delta f$ | 0.50 | MHz | |
| Time Increment | $\Delta t$ | 2.0 | usec | |
| Burst Modulation Frequency | $f_m$ | 1000 | MHz | $\lambda_m = 0.30$ meter |
| Burst Pulse Width | $\tau_w$ | 100 | nsec | |
| Pulse Burst Repetition Time | $T_{prf}$ | 2.0 | usec | |
| ADC Sample Rate | $f_s$ | $10.0 \cdot 10^6$ | SPS | $f_s = 1/\tau_w$ |
| Number of Frequency Steps | $n$ | 256 | - | |
| Transmission Bandwidth | $B_T$ | 128 | MHz | $B_T = n \cdot \Delta f$ |
| Maximum Range | $R_{max}$ | 150 | meter | |
| Unambiguous Range | $R_{un}$ | 300 | meter | |
| Number of Range Bin Samples | $N$ | 10 | - | |
| Pre-Processing Range Resolution | $\delta R_p$ | 15 | meter | $\delta R_p = c\tau_w/2$ |
| Post-Processing Range Resolution | $\delta R$ | 1.2 | meter | $\delta R_p = c/2n\Delta f$ |
| Maximum Closing Velocity | $v_{max}$ | 70 | meter/sec | 70 meter/sec $\Rightarrow$ 250kph |
| Object Dwell Time | $T_{dw}$ | 0.214 | sec | $T_{dw} = \delta R_p/v_{max}$ |
| Data Acquisition Time | $T_{acq}$ | 0.512 | msec | $T_{acq} = n \cdot T_{prf}$ |
| FFT Sample Rate | $f_{s\_FFT}$ | 500 | KHz | $f_{s\_FFT} = 1/T_{prf}$ |
| Bandwidth of LPF | $B_w$ | 10.0 | MHz | $B_w = 1/\tau w$ |
| FFT Resolution Bandwidth | $B_{w\_FFT}$ | 1.95 | KHz | $B_{w\_FFT} = f_{s\_FFT}/n$ |
| Process Gain | $PG_{dB}$ | 24.1 | dB | $PG_{dB} = 10 \cdot \log(n)$ |
| Data Matrix Dimension | $n \times N$ | 256x10 | - | |

*Fig. 12*

| Parameter | Symbol | Value | Units | Note/Comment |
|---|---|---|---|---|
| Scanning mirror angular extent | $\theta_{tot}$ | 24 | ° | $-12° < \theta_{tot} < +12°$ |
| Scanning mirror resolution | $\theta_{3\,dB}$ | 0.1 | ° | scan mirror 3 dB beamwidth |
| Number of scan increments | $k$ | 240 | - | $k = \theta_{tot} / \theta_{3\,dB}$ |
| Frequency Step Increment | $\Delta f$ | 0.50 | MHz | |
| Time Increment (PRF) | $\Delta t$ | 2.0 | usec | |
| Burst Modulation Frequency | $f_m$ | 1000 | MHz | $\lambda_m = 0.30$ meter |
| Burst Pulse Width | $\tau_w$ | 100 | nsec | |
| Pulse Burst Repetition Time | $T_{prf}$ | 2.0 | usec | |
| ADC Sample Rate | $f_s$ | 10.0 | MSPS | $f_s = 1/\tau_w$ |
| Number of Frequency Steps | $n$ | 256 | -- | also the number of scans |
| Transmission Bandwidth | $B_T$ | 128 | MHz | $B_T = n \cdot \Delta f$ |
| Maximum Range | $R_{max}$ | 150 | meter | |
| Unambiguous Range | $R_{un}$ | 300 | meter | $R_{un} = c \cdot T_{prf} / 2$ |
| Number of Range Bin Samples | $N$ | 10 | -- | |
| Pre-Processing Range Resolution | $\delta R_p$ | 15 | meter | $\delta R_p = c\tau_w/2$ |
| Post-Processing Range Resolution | $\delta R$ | 1.2 | meter | $\delta R = c/2n\Delta f$ |
| Maximum Closing Velocity | $v_{max}$ | 70 | meter/sec | 70 meter/sec ⇒ 250kph |
| Object Dwell Time | $T_{dw}$ | 0.214 | sec | $T_{dw} = \delta R_p / v_{max}$ |
| Data Acquisition Time | $T_{acq}$ | 0.123 | sec | $T_{acq} = k \cdot n \cdot T_{prf}$ |
| FFT Sample Rate | $f_{s\_FFT}$ | 976 | Hz | $f_{s\_FFT} = 1/2 \cdot n \cdot T_{prf}$ |
| Bandwidth of LPF | $B_w$ | 10.0 | MHz | $B_w = 1/\tau w$ |
| FFT Resolution Bandwidth | $B_{w\_FFT}$ | 3.8 | Hz | $B_{w\_FFT} = f_{s\_FFT}/n$ |
| Process Gain | $PG_{dB}$ | 24.1 | dB | $PG_{dB} = 10 \cdot \log(n)$ |
| Data Matrix Dimension | $k \times N$ | 240x10 | -- | $n$ data matrices are required |

*Fig. 20*

DIRECT DETECTION LIDAR SYSTEM AND METHOD WITH STEP FREQUENCY MODULATION (FM) PULSE-BURST ENVELOPE MODULATION TRANSMISSION AND QUADRATURE DEMODULATION

RELATED APPLICATION

This application claims the benefit of U.S. Provisional Patent Application No. 62/340,758, filed in the United States Patent and Trademark Office on May 24, 2016, the entire contents of which are incorporated herein by reference.

BACKGROUND

1. Technical Field

The present disclosure is related to LiDAR systems and, in particular, to a direct detection LiDAR system and method with step-FM pulse-burst envelope modulation transmission and quadrature demodulation, which can be used in an automotive or other motor vehicle application.

2. Discussion of Related Art

LiDAR is commonly referred to as an acronym for light detection and ranging, in the sense that LiDAR is commonly considered an optical analog to radar. In general, there are two types of LiDAR systems, namely, incoherent LiDAR and coherent LiDAR. Incoherent LiDAR, also commonly referred to as direct detection or direct energy detection LiDAR, primarily uses an amplitude measurement in light returns, while coherent LiDAR is better suited for phase-sensitive measurements or other more sophisticated transmitter waveform modulation techniques. Coherent systems generally use optical heterodyne detection, which, being more sensitive than direct detection, allows them to operate at a much lower power and provide greater measurement accuracy and resolution, but at the expense of more complex transceiver requirements and cost.

SUMMARY

According to one aspect, a LiDAR system is provided. The LiDAR system includes a signal generator for generating an output signal having a variable frequency. A modulation circuit receives the output signal from the signal generator and modulates the output signal to generate a pulsed modulation envelope signal configured to comprise a plurality of pulses, two or more of the plurality of pulses having two or more respective different frequencies. The modulation circuit applies the pulsed modulation envelope signal to an optical signal to generate a pulse-envelope-modulated optical signal comprising a plurality of pulses modulated by the pulsed modulation envelope signal. Optical transmission elements transmit the pulse-envelope-modulated optical signal into a region. Optical receiving elements receive reflected optical signals from the region. Receive signal processing circuitry receives the reflected optical signals and uses quadrature detection to process the reflected optical signals.

In some exemplary embodiments, the modulation circuit comprises a pulse modulator for modulating the output signal from the signal generator to generate the pulsed envelope modulation signal. The modulation circuit can include a laser modulator for applying the pulsed modulation envelope signal to an optical signal to generate the pulse-envelope-modulated optical signal.

In some exemplary embodiments, the modulation circuit comprises a laser modulator for applying the pulsed modulation envelope signal to an optical signal to generate the pulse-envelope-modulated optical signal.

In some exemplary embodiments, the pulsed modulation envelope signal comprises two or more consecutive pulses at the same frequency.

In some exemplary embodiments, the pulsed modulation envelope signal comprises one and only one pulse at each of a plurality of frequencies.

In some exemplary embodiments, the optical receiving elements comprise a microelectromechanical systems (MEMS) scanning mirror for scanning the region to receive the reflected optical signals from the region. The reflected optical signals from the region can be received through a series of scans of the MEMS scanning mirror. Each of the series of scans can provide receiver coverage over a field of view of the LiDAR system, each scan receiving reflected signals of a single frequency of the pulsed modulation envelope signal.

In some exemplary embodiments, the two or more different frequencies increase with time.

In some exemplary embodiments, the two or more different frequencies decrease with time.

In some exemplary embodiments, the LiDAR system is installed and operates in an automobile.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 12 includes a table of parametric data in a typical automotive operational scenario of a LiDAR system, according to some particular exemplary embodiments.

FIG. 20 includes a table of parametric data in a typical automotive operational scenario of a LiDAR system using a MEMS scanning mirror for data acquisition, according to some particular exemplary embodiments.

DETAILED DESCRIPTION

Direct detection LiDAR systems are characterized by construction and functional simplicity and, unlike the more complex homodyne or heterodyne LiDAR systems, do not utilize frequency translation or down conversion stages, which facilitate signal detection and processing gain advantages. The signal detection and processing gain advantages of homodyne/heterodyne LiDAR systems are enabled by advanced modulation and coding of the transmitted signal combined with sophisticated correlation processing techniques within the LiDAR receiver. Transmit signal modulation and coding, in conjunction with advanced correlation processing techniques, have been utilized within radar systems, from complex military object imaging systems to commercial automotive autonomous cruise control applications. LiDAR systems, with the exception of very advanced measurement requirements, e.g. NASA measurements of $CO_2$ emissions, have not utilized these techniques. However, according to the present disclosure, development of laser transmit signal envelope modulation and quadrature demodulation of the recovered envelope modulation signal has exhibited similar advantages to those associated and achieved via the radar science. Laser transmitter envelope modulation and quadrature demodulation represent a modest increase in complexity of direct detection LiDAR systems with significant benefits in measurement capability and lower operational power by enabling signal processing gain to direct detection LiDAR.

According to the exemplary embodiments described herein in detail, laser transmitter envelope modulation and receiver quadrature demodulation techniques are applied to direct detection LiDAR systems. According to specific exemplary embodiments, the laser transmitter envelope modulation is a step-FM pulse-burst laser transmitter envelope modulation. Data acquisition techniques and processing gain associated with the step-FM pulse-burst laser transmitter envelope modulation are also described herein in detail.

Figure 1:
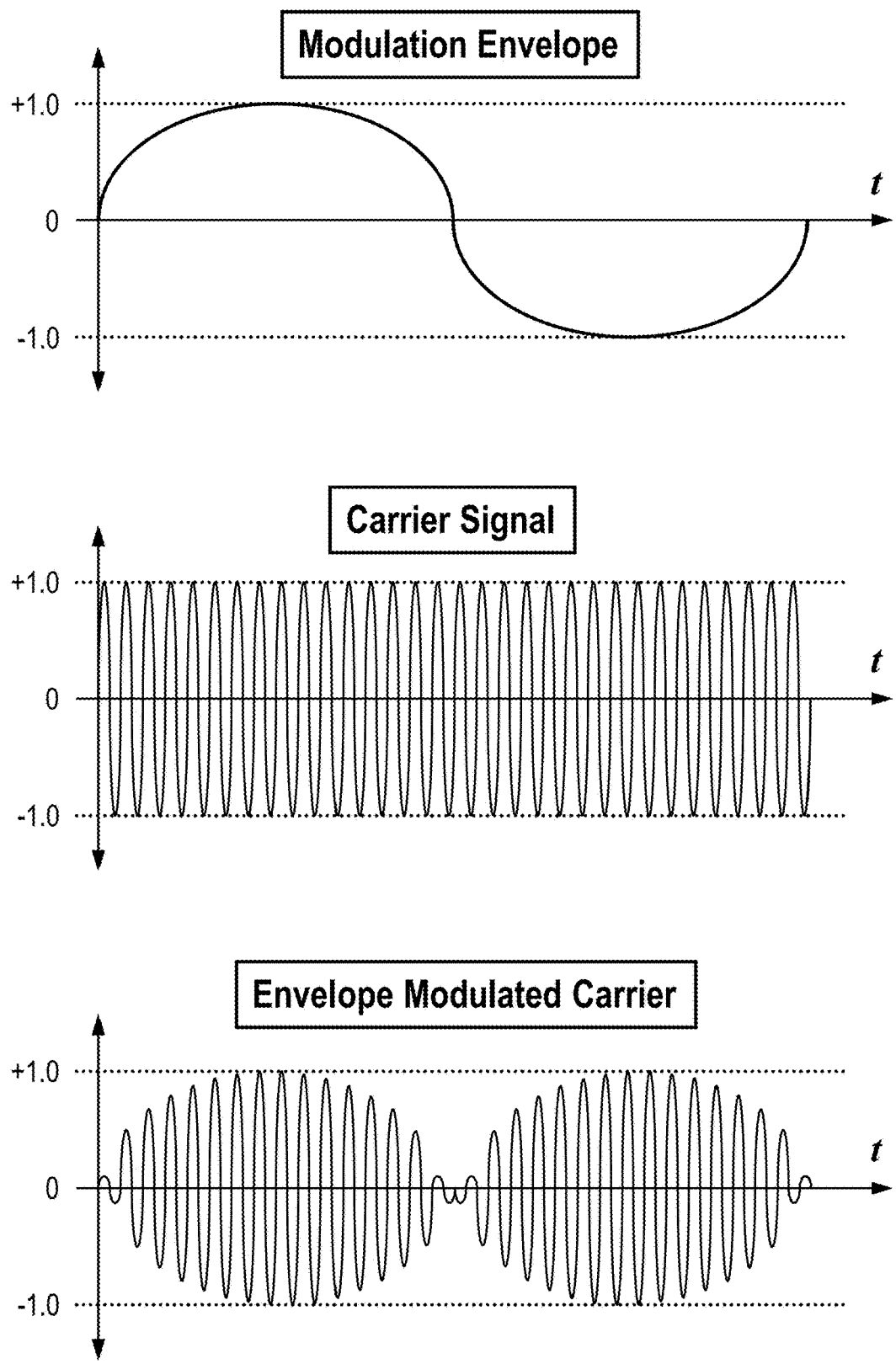
FIG. 1 includes three curves which illustrate transmitter envelope modulation techniques, using a substantially sinusoidal modulation envelope, as applied to direct detection LiDAR.

FIG. 1 includes three curves which illustrate a general instance of transmitter envelope modulation techniques, using a substantially sinusoidal modulation envelope, as applied to direct detection LiDAR, according to exemplary embodiments. Referring to FIG. 1, a modulation envelope signal, a sinusoidal carrier signal and an envelope-modulated carrier waveform are illustrated. The mathematical definitions associated with the envelope modulation waveform, carrier and transmit envelope modulated waveform are in accordance with the following equation (1):

$$\text{Mod}(t) = \sin(2\pi f_m t) \rightarrow \text{modulation waveform}$$

$$\text{Car}(t) = \sin(2\pi f_c t) \rightarrow \text{carrier}$$

$$T_x(t) = \text{Mod}(t) \cdot \text{Car}(t) \rightarrow \text{envelop modulated carrier} \quad (1)$$

It is noted that the envelope-modulated carrier implies multiplication of the modulation waveform and the carrier signal. The direct detection LiDAR system performs the multiplication within the laser modulator element as described below in detail. Unlike other systems which use a modulated carrier, the envelope modulation technique results in transmission of both sidebands.

Figure 2:
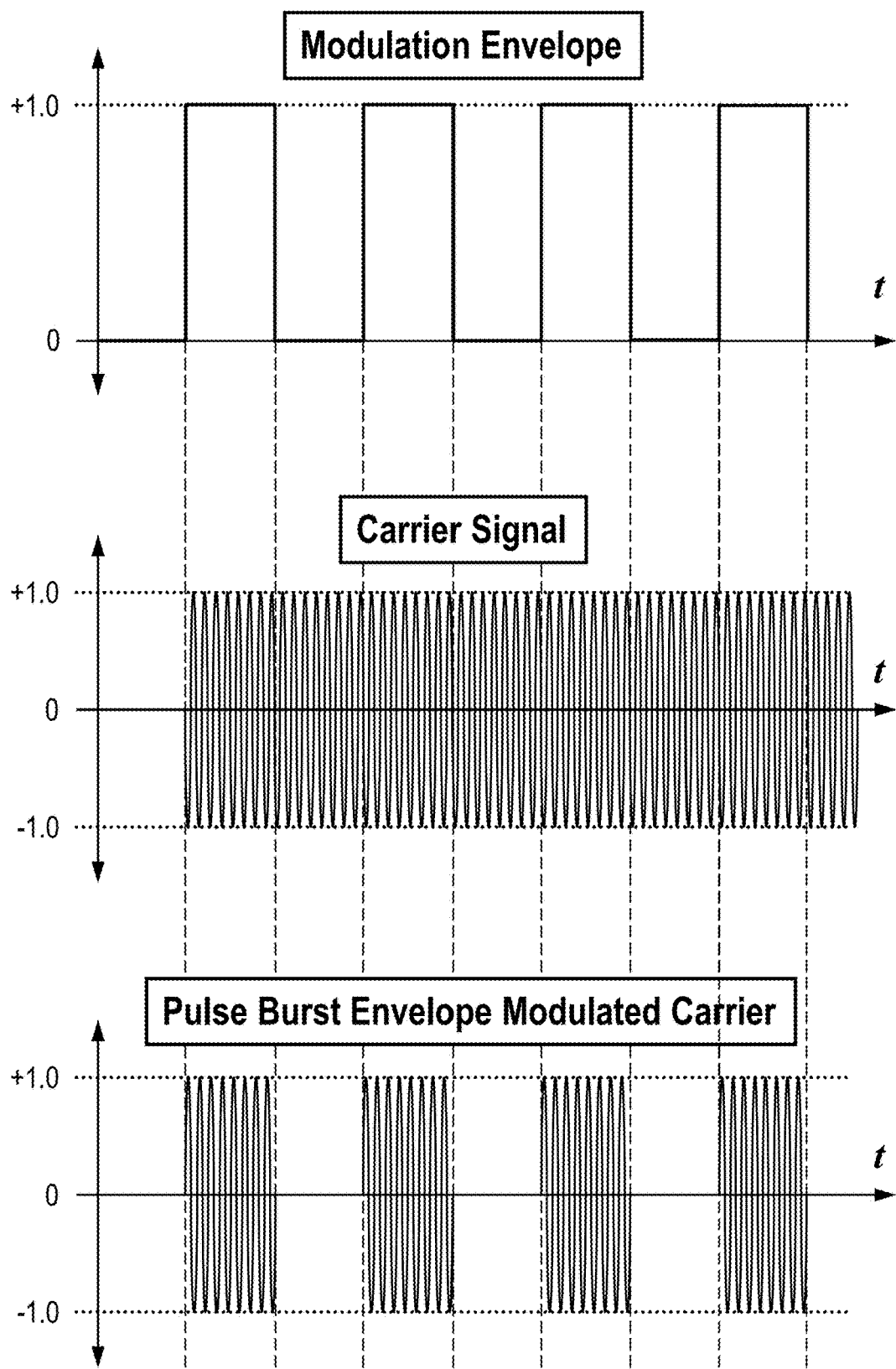
FIG. 2 includes three curves which illustrate transmitter envelope modulation techniques, using a pulse burst modulation envelope, as applied to direct detection LiDAR.

FIG. 2 includes three curves which illustrate transmitter envelope modulation techniques, using a pulse burst modulation envelope, as applied to direct detection LiDAR, according to other exemplary embodiments. Referring to FIG. 2, a modulation envelope signal, a sinusoidal carrier signal and an envelope-modulated carrier waveform are illustrated. In the pulse-burst envelope modulation illustrated in FIG. 2, a repetitive pulse waveform modulates the carrier. Laser modulators are capable of pulse modulation at very high repetition frequencies, e.g., several hundred megahertz, which facilitates coherent detection of the recovered modulation waveform with attendant signal processing benefits as will be described in detail herein.

It should be noted that, in accordance with exemplary embodiments, the position in time of the modulating pulses may be a variable, which allows for pulse position modulation (PPM) coding.

Figure 3:
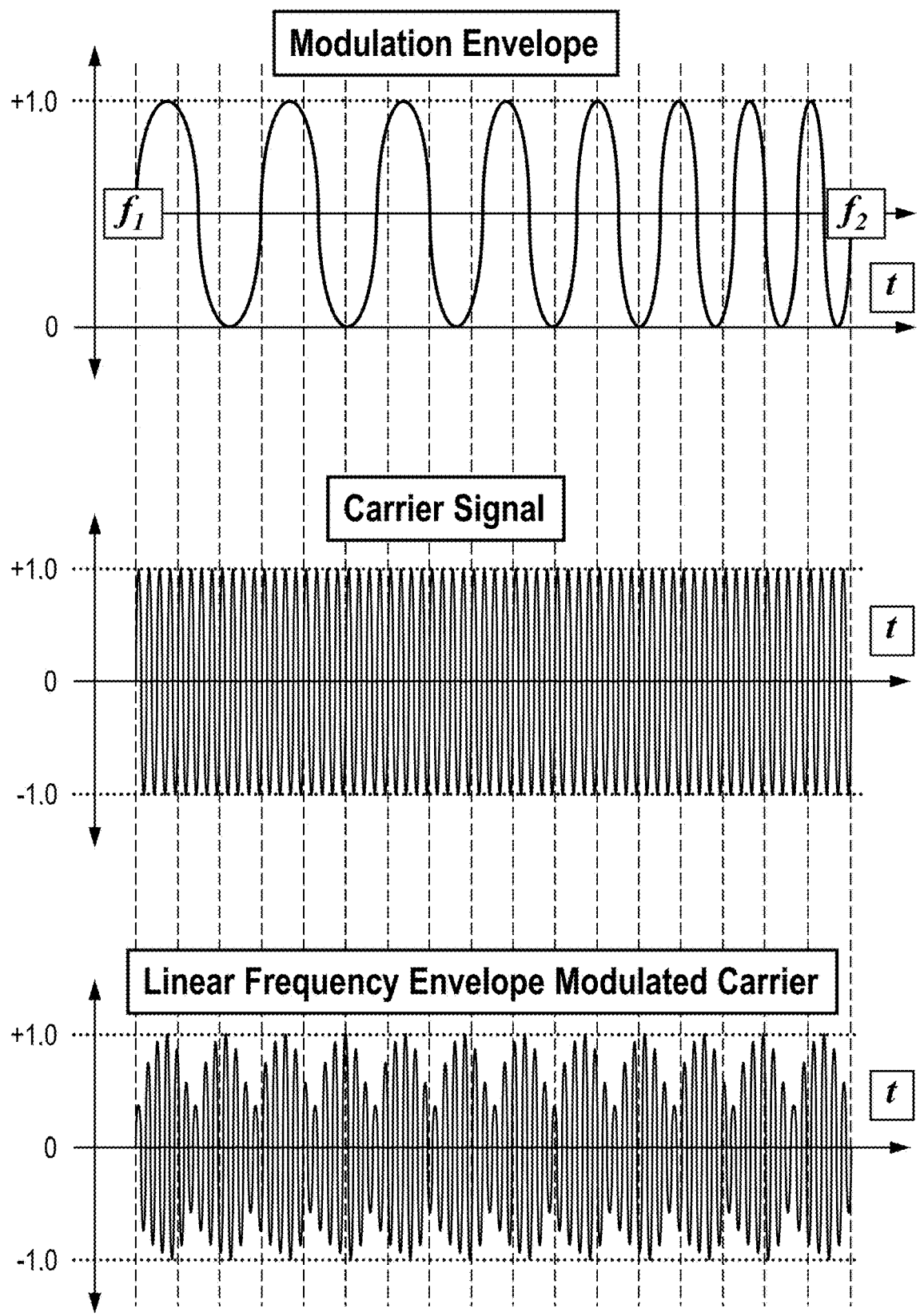
FIG. 3 includes three curves which illustrate transmitter envelope modulation techniques, using linear frequency envelope modulation, as applied to direct detection LiDAR.

FIG. 3 includes three curves which illustrate transmitter envelope modulation techniques, using linear frequency envelope modulation, as applied to direct detection LiDAR, according to other exemplary embodiments. Referring to FIG. 3, a modulation envelope signal having a linear variation in frequency, a sinusoidal carrier signal and an envelope-modulated carrier waveform are illustrated. FIG. 3 illustrates linear frequency envelope modulation, where, in this particular exemplary embodiment, the modulation waveform frequency is linearly changed from $f_1$ to $f_2$ ($\Delta T$) over a specific time interval ($\Delta T$). The linear frequency modulation envelope is advantageous for the implementation of FMCW LiDAR due to the ability to provide high-range resolution in accordance with the frequency deviation ($\Delta F$), lower detection bandwidth and the unique spectral resolution properties of the Fast Fourier Transform (FFT) computation technique.

One principle of transmitter envelope modulation is that upon transmission, the modulation envelope is subject to phase delay in accordance with the envelope frequency. The total transmission phase shift in the two-way range from LiDAR system to object is described by the following equation (2):

$$\Delta\phi = 2\pi \frac{2R}{\lambda_{mod}}; \quad (2)$$

$\Delta\phi$: transmission phase shift $R$: range to object $\lambda_{mod}$: envelop modulation wavelength In exemplary embodiments, upon envelope recovery in a photo-diode, or photodetector or light detector, as described below in detail, the amplitude and transmission phase of the modulation envelope are demodulated in the quadrature demodulator.

In addition to the envelope modulation techniques described above, the step-FM pulse burst envelope modulation waveform LiDAR according to the exemplary embodiments is described in detail below. The step-FM pulse burst envelope modulation waveform as applied to direct detection LiDAR, in accordance with the present disclosure is particularly advantageous for high-range resolution applications where object detection parameters allow the employment of modest bandwidth data acquisition. Unlike pulse compression waveforms, where the data acquisition and signal spectrum require wide bandwidth in the receiver and high-speed analog-to-digital converters, the step-FM pulse waveform receiver of the present disclosure requires a nominal narrow bandwidth receiver and modest sampling rate for the analog-to-digital conversion process.

Figure 4:
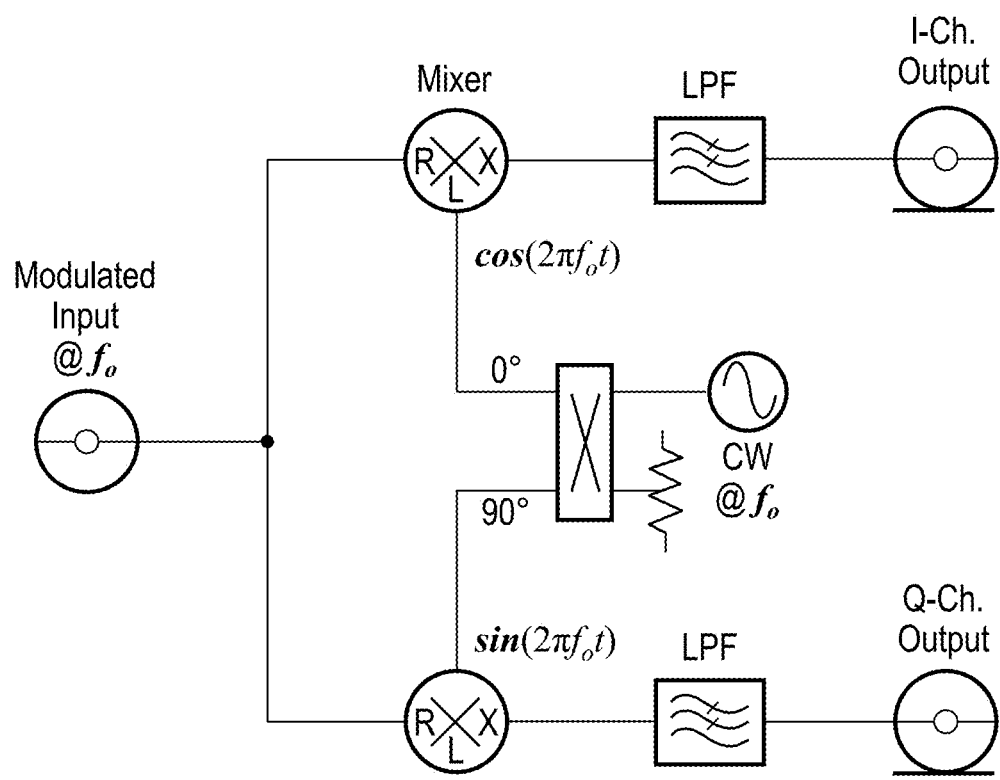
FIG. 4 includes a schematic functional block diagram of a quadrature demodulation system and technique, according to some exemplary embodiments.

FIG. 4 includes a schematic functional block diagram of a quadrature demodulation system and technique, according to some exemplary embodiments. Quadrature demodulation is an efficient detection technique which utilizes the advantages of coherent signals to provide the orthogonal, or vector signal components of a modulated signal. Quadrature demodulation is universal in the sense that it has the ability to recover amplitude modulation (AM), frequency modulation (FM) and phase modulation (PM) components of a modulated signal. Referring to FIG. 4, a modulated input signal to be demodulated, having a frequency, is received and applied to in-phase and quadrature-phase mixers. A quadrature demodulator according to the exemplary embodiments includes a coherent, continuous wave (CW) local oscillator (LO) signal at the modulated carrier input frequency $f_0$, a 0°/90° power divider, the in-phase and quadrature-phase mixers, and low-pass filters to eliminate the LO signal and other spurious signals from the demodulated output, which is provided at an I-channel output and a Q-channel output as shown. In order for the LO to be coherent with the received envelope modulated signal, according to exemplary embodiments, a single-frequency source is utilized for both envelope modulation and quadrature demodulator LO.

Figure 5:
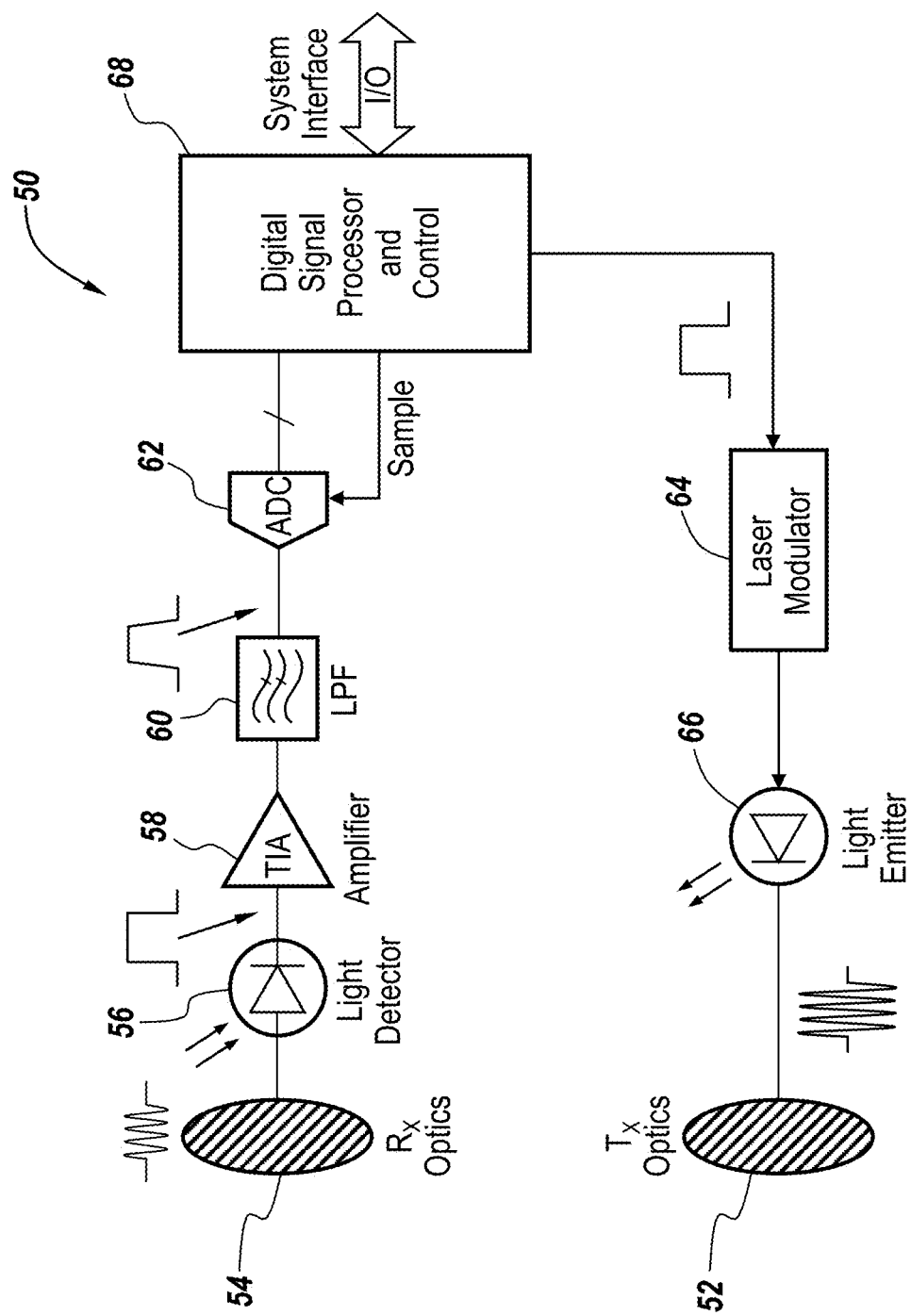
FIG. 5 includes a schematic functional block diagram of a conventional direct detection LiDAR system.

In contrast with the envelop-modulated/quadrature-demodulation direct-detection LiDAR approach of the exemplary embodiments, FIG. 5 includes a schematic functional block diagram of a conventional direct detection LiDAR system 50. Referring to FIG. 5, a typical operational configuration involves the transmission of a high-power laser transmit pulse of short duration, typically 2.0 to 20 nanoseconds, at transmit optics 52, via light emitter 66, modulated under the control of a digital signal processor and control (DSPC) 68 by laser modulator 64. A portion of the transmitted pulse is reflected from an object within the transmitter beam width and subsequently captured by the receive optics 54 and light detector 56 following the two-way time of flight to the object. The received signal is then amplified by the transimpedance amplifier (TIA) 58 and filtered by a low-pass filter (LPF) 60. The analog-to-digital converter (ADC) 62 samples range bins commensurate with the pulse width. Under control of DSPC 68, if a signal is determined to exceed a specific threshold level within a specific range bin, a target is declared. Other processing strategies may be employed to improve the signal-to-noise ratio, e.g., range bin sampling following multiple transmitter pulses and integration of the received signal energy from each transmitted pulse, also known as non-coherent detection; however, the basic operation is limited to high-power pulse transmission and receive signal detection and amplification.

In addition to the above described direct detection LiDAR system 50, a time-of-flight (TOF) system transmits multiple pulses in the form of a square-wave and utilizes a phase detector on receive to measure the two-way time of flight. The time-of-flight system must limit the square-wave modulation frequency in order to avoid phase ambiguity.

Figure 6A:
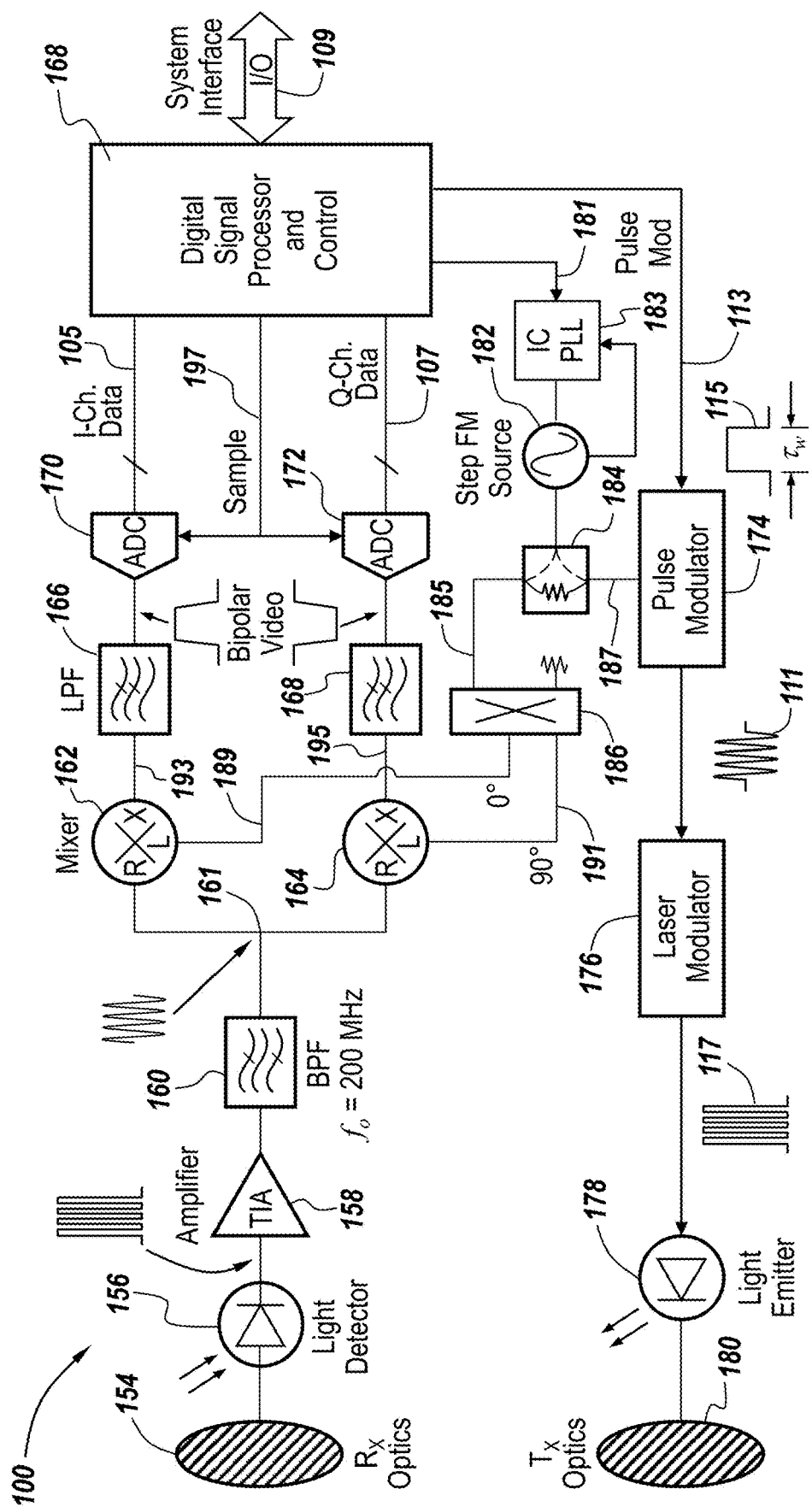
FIG. 6A includes a schematic functional block diagram which illustrates a LiDAR system using step-FM pulse-burst transmit envelope modulation and quadrature demodulation, according to some exemplary embodiments.
Figure 6B:
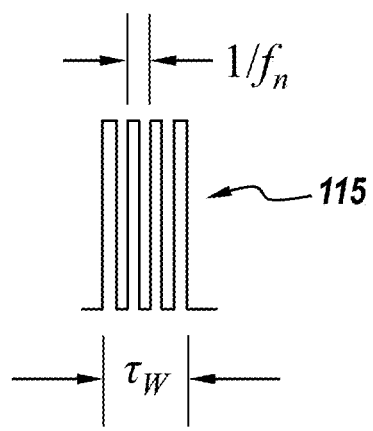
FIG. 6B is a schematic diagram illustrating detail of the step-FM pulse-burst modulation signal used in the system of FIG. 6A, according to some exemplary embodiments.

FIG. 6A includes a schematic functional block diagram which illustrates a LiDAR system 100 using step-frequency-modulation (FM) pulse-burst transmit envelope modulation and quadrature demodulation, according to some exemplary embodiments. In contrast with the conventional raw pulse modulation of the basic direct detection LiDAR system 50 illustrated in FIG. 5, in system 100 of FIG. 6A, a step-FM pulse burst is used instead of a single repetitive pulse. FIG. 6B is a schematic diagram illustrating detail of one pulse of the step-FM pulse-burst modulation signal 115 used in system 100 of FIG. 6A, according to some exemplary embodiments. In system 100 of FIG. 6A, the burst frequency is a step-FM envelope sequence, characterized by incremental step change in frequency $\Delta f$. In some exemplary embodiments, the frequency step sequence continues for n frequency steps, producing a total frequency deviation of $n \times \Delta t$. Also, in system 100 of FIG. 6, the modulation frequency is coherent with the recovered envelope on receive, thereby providing an efficient means of modulated signal detection. Also, a band-pass filter centered at the arithmetic mean of the burst frequency attenuates the broadband noise of the TIA, and also the 1/f noise associated with the photodetector and TIA. Also, a quadrature demodulator is employed to recover pulse burst envelope and attendant two-way transmission phase shift of the modulation envelope.

Referring to FIGS. 6A and 6B, LiDAR system 100 according to exemplary embodiments includes receive optics 154 at which optical energy, including optical returns from one or more target objects, are received. The optical energy is received from receive optics 154 at a light detector 156, which converts the received optical energy to one or more electrical signals, such as, for example, the illustrated square wave signal. The electrical signals are amplified by TIA 158 and filtered by BPF 160, having a center frequency at the burst modulation frequency $f_1$ to $f_n$. The resulting amplified and filtered signal, illustrated in FIG. 6A as a substantially sinusoidal signal, is applied at node 161 to first inputs of I/Q mixers 162, 164.

The modulating step-FM signal is generated by a step-FM source, which includes a voltage-controlled oscillator (VCO) 182 under the control of a control signal from phase-locked loop (PLL) control circuit 183, which is in turn controlled by DSPC 168 via a control signal on line 181. The output signal of VCO 182 is applied to a power splitter 184, which splits the signal and provides the split signal at two outputs. The first output 185 is routed to splitting and phase shifting circuitry or 90-degreee power splitter 186, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degreee power splitter 186 generates a first "in-phase" local oscillator (LO) signal 189 and a second "quadrature-phase" or "quadrature" LO signal 191, which is shifted in phase by 90 degrees with respect to in-phase LO signal 189. The in-phase and quadrature-phase LO signals 189, 191 are applied to second "L" inputs of I/Q mixers 162, 164, respectively. I/Q mixers 162, 164 mix the amplified and filtered input signal at node 161 applied at first "R" inputs of I/Q mixers 162, 164 with the in-phase and quadrature-phase LO signals 189, 191, respectively, to generate output signals 193, 195, respectively, which are low-pass filtered by low-pass filter (LPF) 166 and LPF 168, respectively. The resulting filtered analog signals are converted to digital signals by analog-to-digital converters (ADC) 170, 172, respectively, and sampled under the control of sample control signal 197, which is generated by DSPC 168. The resulting sampled digital I/Q (quadrature) signals, i.e., I-channel and Q-channel signals, 105, 107 are processed by DSPC 168 to determine range and/or velocity of the one or more target objects. Results of this detection processing performed by DSPC 168 can be forwarded as desired, such as, for example, to a user interface, via a system interface 109.

Continuing to refer to FIGS. 6A and 6B, the second output 187 of power splitter 184 is routed to a pulse modulator 174, which converts the substantially sinusoidal signal 187 from power splitter 184 to a pulsed substantially sinusoidal signal 111. The timing of pulses in the pulsed sinusoidal signal 111 is controlled by step-FM pulse-burst modulation signal 115 on output signal line 113 from DSPC 168. That is, step-FM pulse-burst modulation signal 115 is used by pulse modulator 174 to modulate substantially sinusoidal signal 187 to generate pulsed substantially sinusoidal signal 111. The resulting pulsed modulated signal 111 from pulse modulator 174 is applied as a modulation signal to a laser modulator 176, which generates a control/modulation signal 117, which is applied to light emitter 178 to generate a step-FM pulse-burst modulated optical signal, which is transmitted to transmit optics 180, by which the step-FM pulse-burst modulated optical signal is transmitted to the one or more target objects.

According to exemplary embodiments, the quadrature detection precedes analog-to-digital conversion. The quadrature detector recovers the pulse modulation envelope associated with the low-frequency pulse modulation. The data samples are subsequently processed via spectral resolution or other means of each range bin data set. The spectral resolution approach used reduces the detection bandwidth and effectively integrates the energy of the range bin sample set.

Figure 7A:
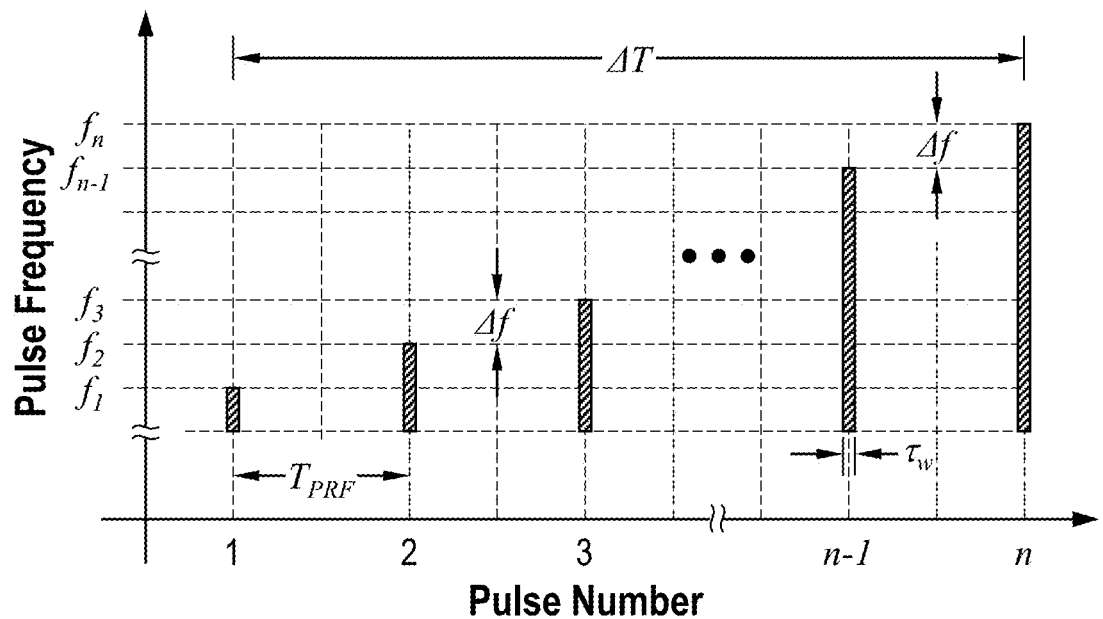
FIGS. 7A and 7B include schematic diagrams of step-FM pulse-burst envelope modulation waveforms, according to some exemplary embodiments.
Figure 7B:
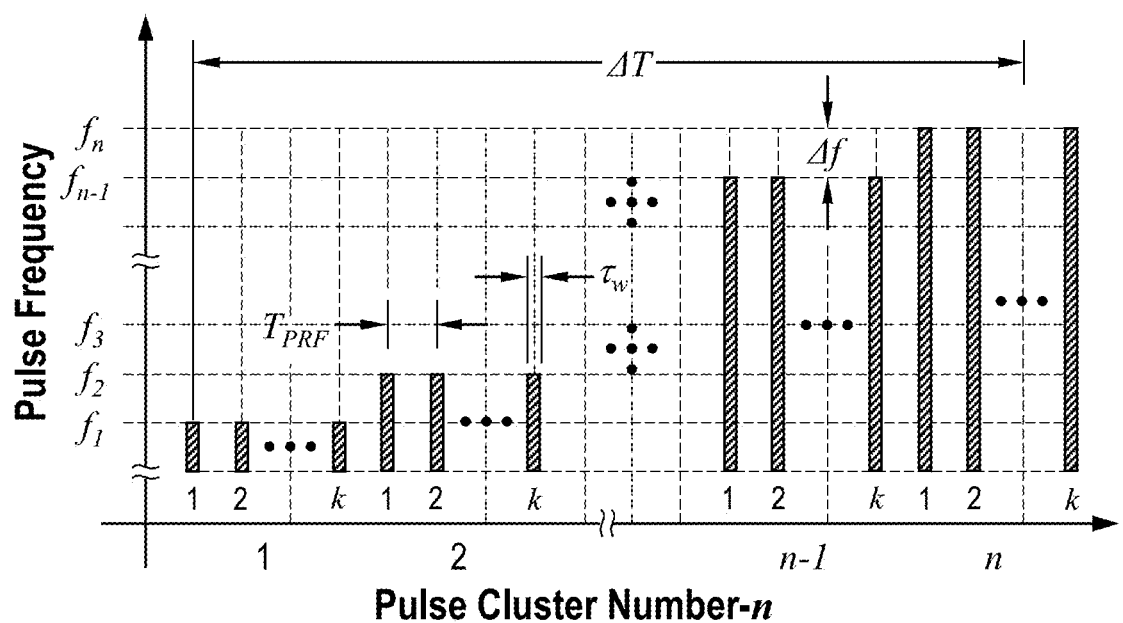

FIGS. 7A and 7B include schematic time diagrams of step-FM pulse-burst envelope modulation waveforms, according to exemplary embodiments. Specifically, FIG. 7A illustrates the step-FM pulse-burst modulation waveform in the case of a single pulse burst dwell with consecutive frequency increments. FIG. 7B illustrates the step-FM pulse-burst modulation waveform in the case of multiple bursts at each of a plurality of frequencies, i.e., the pulse bursts are grouped in a series of fixed-frequency clusters. That is, exemplary step-frequency pulse burst envelope modulation waveforms according to the present disclosure are graphically illustrated in FIGS. 7A and 7B, where consecutive steps are separated in frequency by $\Delta f$ in FIG. 7A, and a cluster of k, fixed-frequency pulse bursts are represented before advancing in frequency by $\Delta f$ to the next cluster in FIG. 7B. The consecutive frequency increments of FIG. 7A provide rapid detection of objects within the illumination volume of the transmit and receive optics, while the fixed-frequency cluster of FIG. 7B provides the capability of additional processing gain via additional received signal integration from each cluster.

In the fixed-frequency cluster embodiment of FIG. 7B, the increased number of pulses increases cycle time. However, this approach realizes benefits of increased signal-to-noise ratio (SNR), better longer-range performance, and better Doppler resolution. In some embodiments, a combination of the approaches of FIGS. 7A and 7B can be used, for example, using the relatively fast scan of FIG. 7A for close-range monitoring and the scan according to FIG. 7B for longer-range monitoring.

Figure 8A:
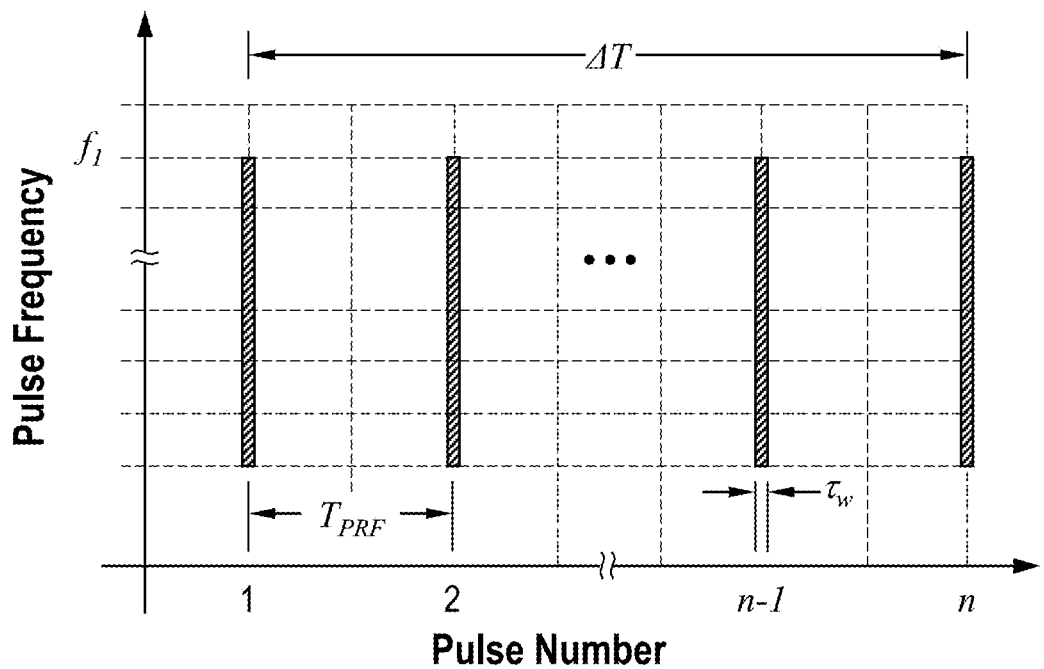
FIGS. 8A and 8B include schematic diagrams of step-FM pulse-burst envelope modulation waveforms, including single-frequency and two-frequency envelope modulation waveforms, respectively, according to some exemplary embodiments.
Figure 8B:
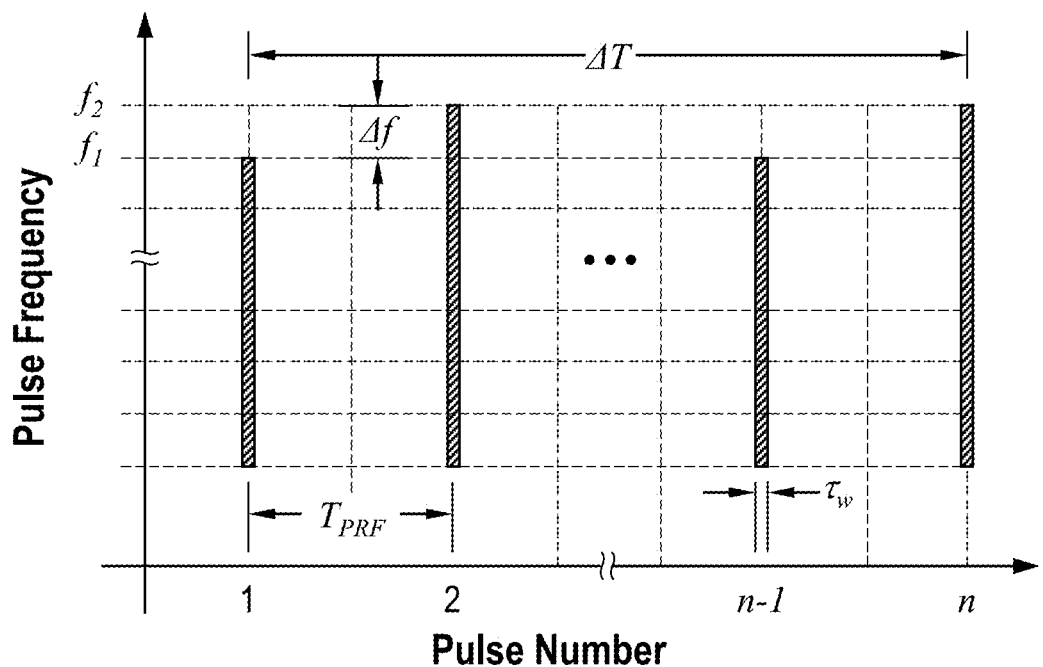

In addition to the consecutive sequence of FIG. 7A and cluster sequence of FIG. 7B, it should be noted that the number of frequency steps may include a single frequency or two-frequency frequency shift keying (FSK), and may be utilized separately or in conjunction with the consecutive or cluster sequences. FIGS. 8A and 8B include schematic time diagrams of step-FM pulse-burst envelope modulation waveforms, including single-frequency and two-frequency envelope modulation waveforms, respectively, according to exemplary embodiments. The single frequency of FIG. 8A is applicable to the measurement of Doppler frequency, which enables relative velocity measurement between LiDAR system 100 and target objects. The FSK or two-frequency sequence of FIG. 8B is also advantageous with respect to Doppler frequency measurement. The reduced transmission bandwidth of single-frequency or two-frequency FSK, although facilitating Doppler frequency measurement, limits high resolution range measurement, as disclosed by the range resolution Equation 3:

$$\delta R = \frac{c}{2 \cdot n \cdot \Delta f} \quad (3)$$

$\delta R$ range resolution (meters)

$n$ number of frequency increments $\Delta f$ step frequency deviation (Hz)

$c$ speed of light (meters per second)

A significant advantage of the step-FM pulse-burst envelope modulation waveform is the high range resolution capability provided by the transmission bandwidth, $n \cdot \Delta f$, and modest bandwidth data acquisition. The ability to detect the change in two-way transmission phase of the step-frequency envelope modulation signal is the basis for high-range resolution measurements. Detection of the step-frequency envelope phase shift is a consequence of the coherent detection process of the quadrature demodulator, according to exemplary embodiments.

It should be noted that the term "pulse burst" as used herein refers to the shape of the modulation envelope signal, that is, the signal that modulates the optical carrier, examples of which are illustrated in the time diagrams of FIGS. 7A and 7B. The term "pulse" refers to the feature of the envelope signal that it is "active" for a certain period of time ($\tau_w$) and "inactive" in the time between pulses. The thin, vertical rectangular hashed regions in FIGS. 7A and 7B are "pulses," as described herein.

It should be further noted that the term "burst" refers to the fact that, within each pulse, the envelope signal is a periodic signal, e.g., sine wave, square wave, etc., at a frequency $f_i$ where $i=1, \ldots, n-1, n$. FIG. 6B, illustrates the detail of one pulse of duration $\tau_w$, having a burst of frequency $f_n$ and, therefore, a period as illustrated of $1/f_n$.

In some exemplary embodiments, consecutive pulses include a "burst" at a frequency f that increases ("increments") by $\Delta f$ at each consecutive pulse, as illustrated in FIG. 7A. In other exemplary embodiments, the pulses are part of a longer "dwell" or "fixed frequency cluster" in which multiple consecutive pulses have bursts at the same frequency $f_i$, as illustrated in FIG. 7B. In this latter embodiment, the frequency $f_i$ of consecutive clusters of same-frequency bursts increases ("increments") by $\Delta f$ at each consecutive cluster of pulse bursts. That is, "burst" refers to the periodic signal at $f_i$ within each "pulse."

Figure 9:
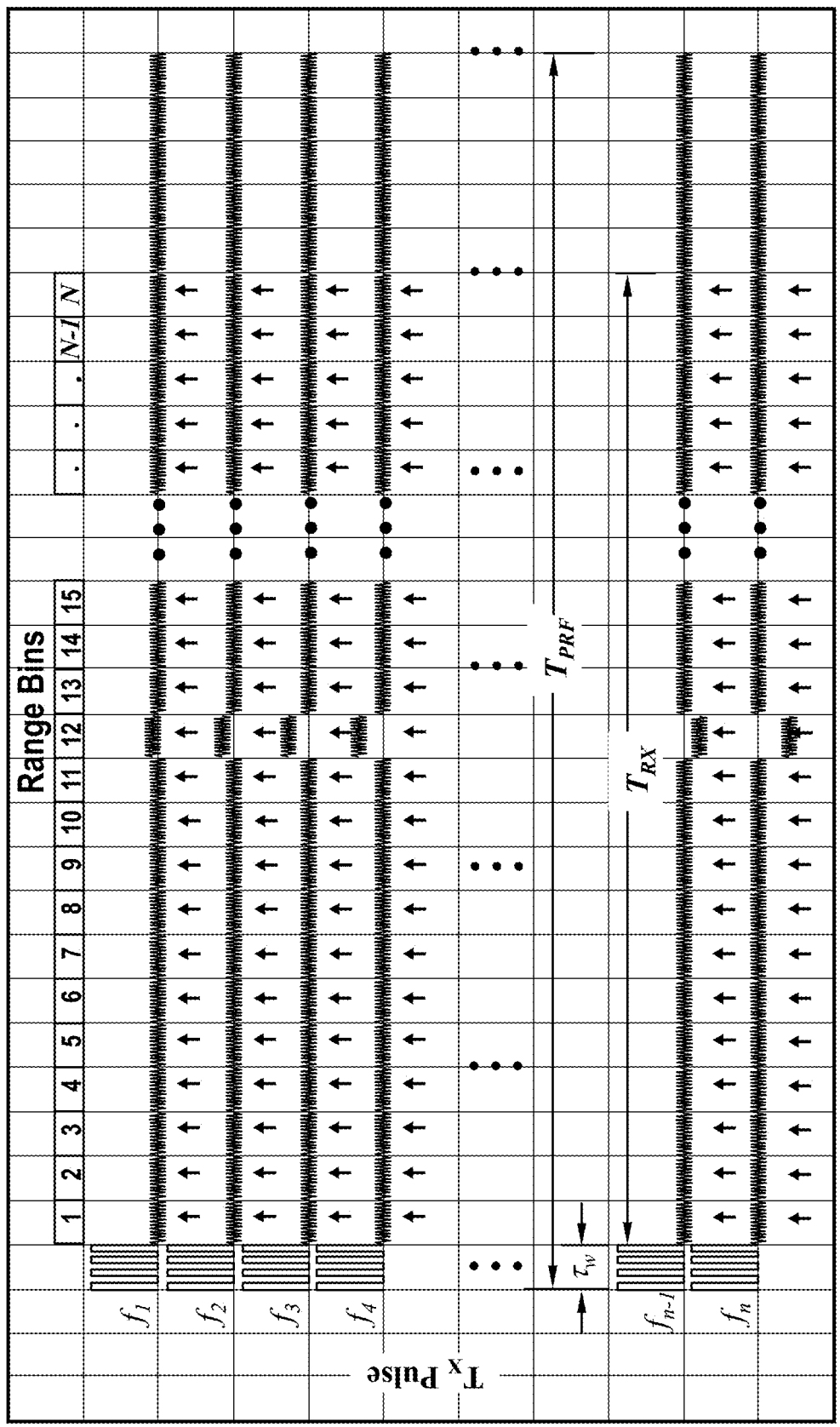
FIG. 9 includes a schematic diagram illustrating the data acquisition process as related to the step-FM pulse-burst envelope modulation waveform, according to some exemplary embodiments.

FIG. 9 includes a schematic diagram illustrating the data acquisition process as related to the step-FM pulse-burst envelope modulation waveform, according to exemplary embodiments. FIG. 9 represents the filling of a data matrix (set) following successive transmission pulses. Referring to FIG. 9, the first stage in the step-FM pulse burst envelope modulation LiDAR system signal processing is acquisition of a data set which represents the signal level of each range bin at the output of each channel of the quadrature demodulator from successive transmission pulses. The graphic of FIG. 9 illustrates the analog data points following successive transmission pulses; a frame is defined as a single transmission pulse burst ($\tau_w$), followed by a receive interval ($T_{Rx}$) during which the ADC 170, 172 acquires a sample from each channel of the quadrature demodulator output at each range bin. A range bin is defined in accordance with the pulse burst width ($\tau_w$), which sets the preprocessing range measurement resolution. The preprocessing range resolution may be written as represented in Equation 4:

$$\delta R = \frac{c\tau_w}{2} \tag{4}$$

$\delta R$ is the range resolution $\tau_w$ is the pulse burst width c is the speed of light Referring to FIG. 9, which may represent an I-channel or Q-channel signal, the arrows designate sample points of the ADCs 170, 172. A variable-amplitude return signal is noted in range bin 12. The variable amplitude is a consequence of coherent detection of the change in phase due to the change in frequency of successive transmission pulse bursts. A principle of transmitter envelope modulation is that upon transmission, the modulation envelope is subject to phase shift in accordance with the envelope modulation frequency. The total envelope transmission phase associated with the two-way range to an object may be written at frequency, $f_0$:

$$\phi_o = 2\frac{2\pi R}{c}f_o \tag{5}$$

Similarly, the total transmission phase associated with the two-way range for successive transmission frequencies may be written:

$$\phi_1 = 2\frac{2\pi R}{c}f_1, \quad \phi_2 = 2\frac{2\pi R}{c}f_2 \tag{6}$$

The general expression for the two-way signal transmission phase for each transmission frequency may be written:

$$\phi_i = 2\frac{2\pi R}{c}f_i \text{ for } i \in 0 \ldots n-1 \tag{7}$$

The reflected signal from an object at range R, assuming that the transmitted signal is a co-sinusoidal with zero phase reference, may be written:

$$s_i(t) = \alpha\cos(2\pi f_i t_i + \phi_i) \tag{8}$$

$$s_i(t) = \alpha\cos\left[2\pi\left(t + \frac{2\pi R}{c}\right) \cdot f_i\right] \tag{9}$$

The reflected signal is applied to the quadrature demodulator and converted to in-phase and quadrature-phase video signals as represented within the following Equation 10:

$$\begin{pmatrix} X_I(t) \\ X_Q(t) \end{pmatrix} = \begin{pmatrix} \alpha_i \cos\phi_i \\ \alpha_i \sin\phi_i \end{pmatrix} \tag{10}$$

The coefficient, $\alpha$, is the loss associated with the two-way path loss, the transmission and receive optics, and object reflectivity.

There are three constraints with respect to the step-FM waveform. These include the following.

1. In order to avoid received signal phase ambiguity, the differential phase shift between step frequency increments must be less than $2\pi$, which imposes a constraint to the maximum frequency step size. Stated mathematically:

$$\Delta\phi_{i+1,i} = \phi_{i+1} - \phi_i = 2\pi\left(\frac{2R}{c}\right) \cdot (f_{i+1} - f_i) = 2\pi\left(\frac{2R_{max}}{c}\right) \cdot \Delta f \leq 2\pi \tag{11}$$

2. In order to perform coherent quadrature demodulation, the duration of the step frequency increment ($\Delta t$) must be equal to or greater than the two-way time-of-flight between the LiDAR system and object at the maximum range of operation. Stated mathematically:

$$\Delta t \geq \frac{2R_{max}}{c} \quad (12)$$

3. In order to avoid range ambiguity, the pulse burst repetition interval, ($T_{prf}$) must be greater than the two-way time-of-flight to the range at which the highest signal level is expected. Stated mathematically:

$$T_{prf} \geq \frac{2R_{unamb}}{c} \quad (13)$$

It is noted that constraints 1 and 2 are related to the maximum operational range, $R_{max}$; therefore, for a maximum operational range of 150 meters, for example, the maximum frequency step increment is 1.0 MHz, and the minimum step frequency dwell time is 1.0 μsec. If the highest signal level from an object is expected at 300 meters, the pulse burst repetition interval must be greater than 2.0 μsec.

Figure 10:
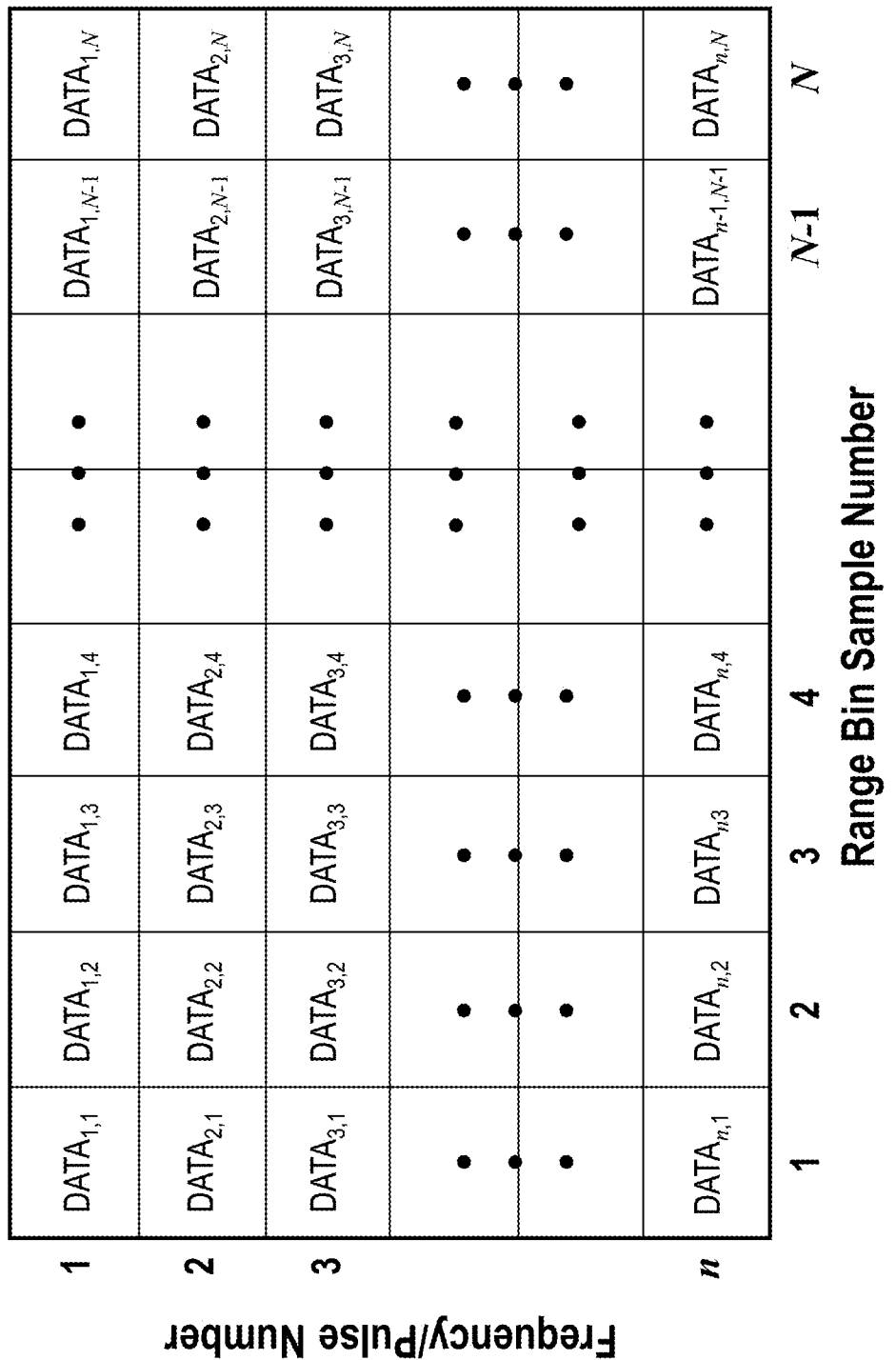
FIG. 10 includes a schematic diagram of a step-FM pulse-burst waveform data matrix, according to some exemplary embodiments.

FIG. 9 represents range bin signal data at either of the quadrature demodulated outputs (I-channel or Q-channel) at a particular range bin. It is noted that a bipolar video signal appears in range bin 12, which indicates the presence of an object; as contrasted with receiver noise only in other range bins. ADCs 170, 172 digitize each of the I-channel and Q-channel sampled range bins and subsequently fill, or populate, the locations of a dimension (n×N) data matrix as illustrated in FIG. 10, which is a schematic diagram of a step-FM pulse-burst waveform data matrix, according to some embodiments.

Upon completion and assembly of the n×N data matrix, enhancement of the detection process can be performed to provide accurate object range and velocity measurements. In some exemplary embodiments, detection enhancement is accomplished via exploitation of the data matrix using available signal processing techniques. The columns of the n×N data matrix represent range bin signal level from multiple transmission pulses, which may be summed through the process of coherent integration. Coherent integration adds the signal level from multiple pulses and effectively increases the signal-to-noise ratio. This is significant because LiDAR object measurement error variance is reduced in direct proportion to the signal-to-noise ratio.

Two processing techniques available to enhance signal detection via increase to the signal-to-noise ratio are coherent pulse integration and spectral resolution of each column of the data matrix. Each column of the data matrix represents range bin samples taken at discrete time points following transmission of the pulse burst. The approach related to coherent pulse integration is captured within the following Equation 14:

$$A_{PI} = \sum_{i=1}^{n} (I_i^2 + Q_i^2); \quad (14)$$

$I_i$: $i^{th}$ I-channel value of a range bin column $Q_i$: $i^{th}$ Q-channel value of a range bin column In the presence of zero-mean, Gaussian noise, ideal coherent pulse integration improves the signal-to-noise ratio by n, the number of pulses integrated.

In addition to the pulse integration technique described above, spectral resolution may be performed to effect increase to the signal-to-noise ratio. The sample data from objects is mathematically represented by sinusoidal signals as a result of the change in transmission phase of the modulation envelope. Spectral resolution of the column data is executed in accordance with the Discrete Fourier Transform (DFT), as defined within the following Equation 15:

$$DFT_k = \sum_{i=0}^{n-1} \left[ I_i \cos\left(2\pi \frac{ki}{n}\right) - jQ_i \sin\left(2\pi \frac{ki}{n}\right) \right] \quad (15)$$

$DFT_k$: $k^{th}$ element of the discrete Fourier Transform $I_i$ and $Q_i$: as previously defined The Fast Fourier Transform (FFT) is a computationally efficient process for the calculation of the DFT, which implements a set of n identical filters, or filter bank, distributed uniformly over the frequency domain at intervals of 1/nT, where T is the time interval over which n samples of a waveform have been acquired. The FFT is particularly well suited to spectral resolution in FM radar and LiDAR instrumentation because the data processing requires a filter bank which may be implemented numerically with a modest-capability digital signal processor (DSP), programmable logic device (PLD), or field-programmable gate array (FPGA).

Figure 11:
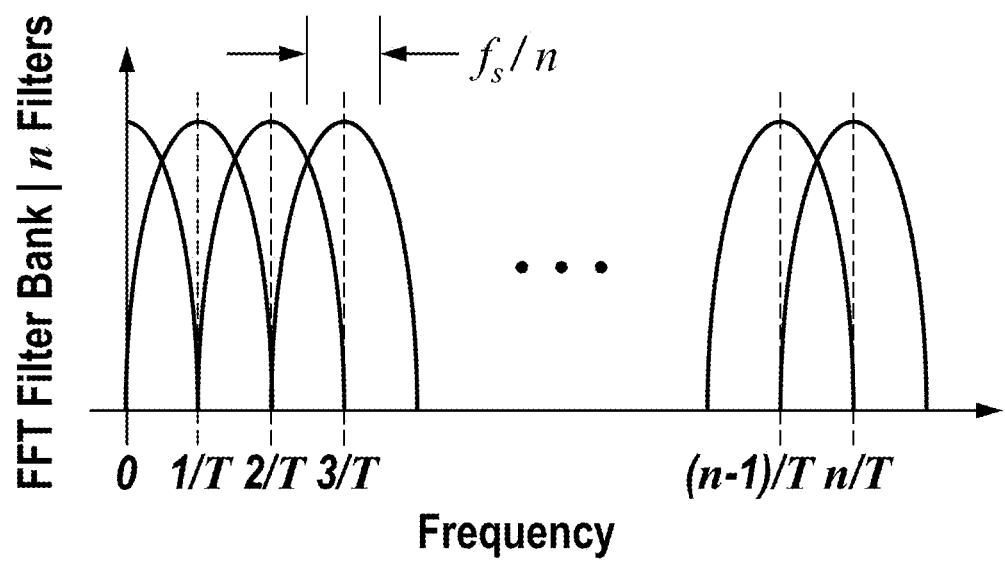
FIG. 11 includes a schematic diagram illustrating FFT implementation of a filter bank of N filters, according to some exemplary embodiments.

FIG. 11 includes a schematic diagram illustrating FFT implementation of a filter bank of N filters, according to some exemplary embodiments. The graphic of FIG. 11 illustrates the filter bank attributes of the FFT. The impact of the filter bank is significant because the signal energy from each detected object is concentrated within a single filter of the filter bank to the extent of the range resolution. Also of significance is the reduction in the noise detection bandwidth (fin) which improves the signal-to-noise ratio.

The spectral resolution filter bank of FIG. 11 represents specific range bin signal level content. The signal level of each range bin filter is examined to determine if the signal level exceeds a predetermined threshold level; whereupon, a binary object decision is executed with respect to "presence" or "absence." In some exemplary embodiments, the range bin signal level is utilized as constituent elements of a point-cloud data set, for example, an object surface map or image.

As described in detail herein, enhancing processing gain such as by increasing signal-to-noise ratio within direct detection LiDAR systems offers significant benefits with respect to system operational parameters and, in particular, measurement accuracy and detection range. Signal processing gain is a direct result of the combination of transmit envelope modulation and coherent, quadrature demodulation, according to the present disclosure. Specific attributes pertaining to step-FM pulse-burst transmit envelope modulation and quadrature demodulation are described herein in detail. The data acquisition process and spectral resolution signal processing of the exemplary embodiments are described herein in detail.

The columns of the data matrix of FIG. 10 contain numerical values which have been acquired following transmission of each step frequency pulse burst via sampling of the individual range bins. The samples represent a sinusoidal signal at a frequency proportional to the step frequency, $f_i$ and the range to the object, R. The applicable Equations (8) and (9) are repeated and modified to reflect quadrature demodulation (down conversion) here for convenience.

$$s_i(t)_I = \alpha' \cos\left(2\pi \frac{2R}{c} f_i\right) \text{ and } s_i(t)_Q = \alpha' \sin\left(2\pi \frac{2R}{c} f_i\right) \quad (16)$$

It is noted that the frequency variable, $f_i$, has been indexed in accordance with the transmission frequency at the sample time of the ADCs 170, 172; and that the amplitude coefficients have been primed (') to indicate the receiver gain. Effectively, via the sequence of step frequency changes, the transformation of range-to-frequency has been implemented. Spectral resolution of the range bin samples, the data matrix columns, may be utilized to increase the signal energy via effective pulse integration and reduction of the noise detection bandwidth, thereby enabling processing gain.

Spectral resolution is efficiently executed by the FFT as previously described. To emphasize this point, it is descriptive to quantify the signal processing gain for the step-FM pulse-burst LiDAR system 100 of the exemplary embodiments. To that end, FIG. 12 includes a table of parametric data in a typical automotive operational scenario of LiDAR system 100, according to some particular exemplary embodiments.

Referring to the parametric data in FIG. 12, object dwell time is calculated for the pre-processing range resolution of 15 meters, as an illustrative example. Data acquisition time (0.512 msec) is the time required to fill the 256×10 data matrix and is consistent with rapid MEMS mirror scanning, described below in detail. The FSK (n=2) waveform provides high resolution Doppler frequency measurement with an attendant reduction in range resolution. Measurement of range and Doppler via FSK facilitates object assignment when used in conjunction with higher number of frequency increments. Repetition of the data acquisition process enables additional processing gain.

Figure 13:
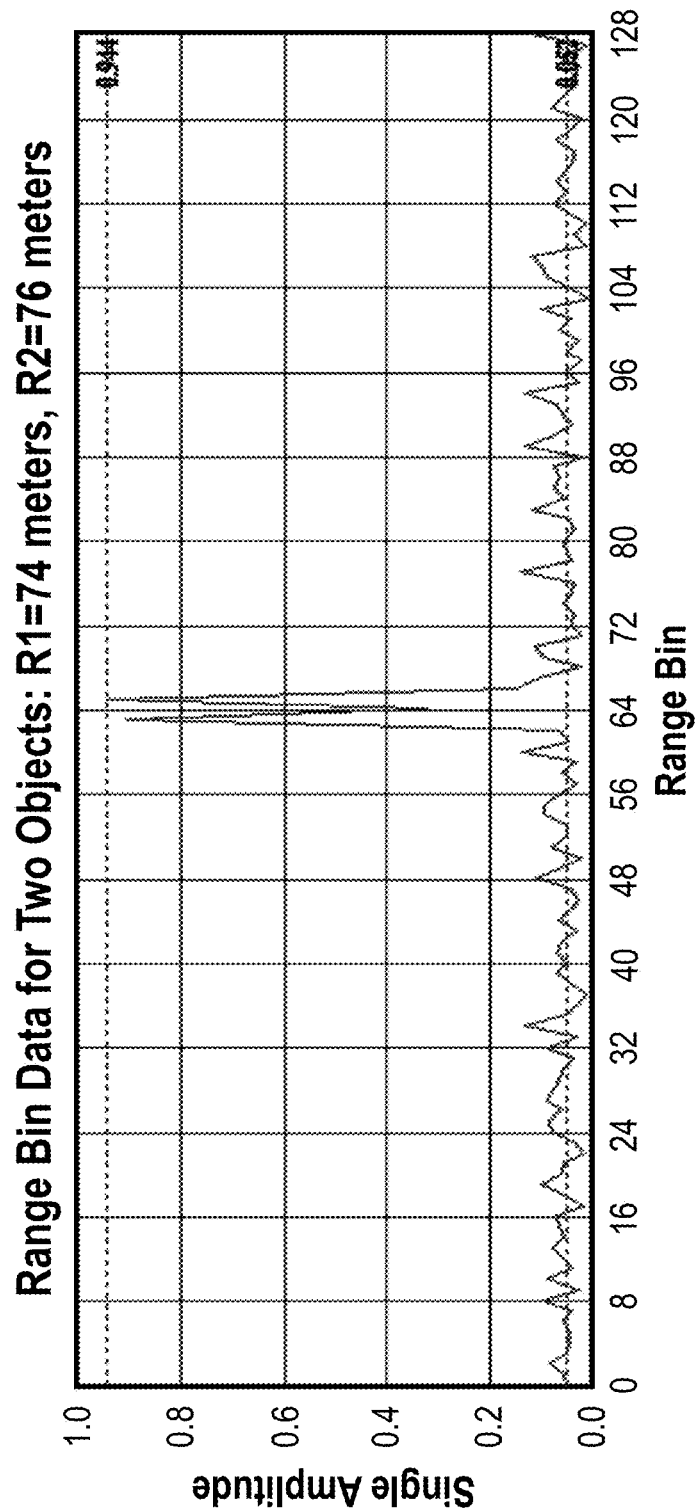
FIG. 13 includes a schematic diagram graphically illustrating results of a processing gain simulation using a 256-point FFT for purposes of the simulation, according to some exemplary embodiments.

FIG. 13 includes a schematic diagram graphically illustrating results of a processing gain simulation using a 256-point FFT for purposes of the simulation, according to exemplary embodiments. Referring to FIG. 13, simulation of the processing gain illustrates 25.1 dB of signal-to-noise ratio increase. FIG. 13 also simulates the range measurement resolution for object separated in range by 2.0 meters, as an exemplary illustration, It is noted that two objects, separated by 2.0 meters, for example, are readily discerned, which validates the post-processing range resolution estimate. For the exemplary simulation, each object was introduced at 0.0 dB signal-to-noise ratio. Zero-mean Gaussian noise was used for the noise component. Reseeding of the random number generator and executing the FFT for 10 trials produced an average increase to signal-to-noise ratio of 24.3 dB, which compares favorably to the ideal processing gain value of 24.1 dB (10·log [256]=24.1 dB).

Significant elements of the exemplary embodiments include the change in transmission phase shift of the envelope modulation waveform over the two-way range to the object, and coherent detection of the envelop modulation waveform within the quadrature demodulator. The local oscillator for the quadrature demodulator is also the source of the envelope modulation signal.

A fundamental feature of transmitter envelope modulation according to the exemplary embodiments is that upon transmission, the modulation envelope is subject to phase delay in accordance with the envelope modulation frequency. Upon recovery of the modulation envelope in the photo detector diode, the amplitude and transmission phase of the modulation envelope are detected within the quadrature demodulator.

In some exemplary embodiments, the LiDAR system can include a microelectromechanical system (MEMS) scanning mirror for enhancing processing of optical signals. MEMS scanning mirrors are one of the technologies for implementation of laser beam scanning. MEMS mirrors are manufactured using semiconductor technology which facilitates high volume manufacturing, repeatable performance and low cost. Additional attributes of the MEMS scanning mirror technology are high tolerance to vibration and operational environment, accurate/rapid scanning, electronic control of scanning mirror position and small volume.

Figure 14:
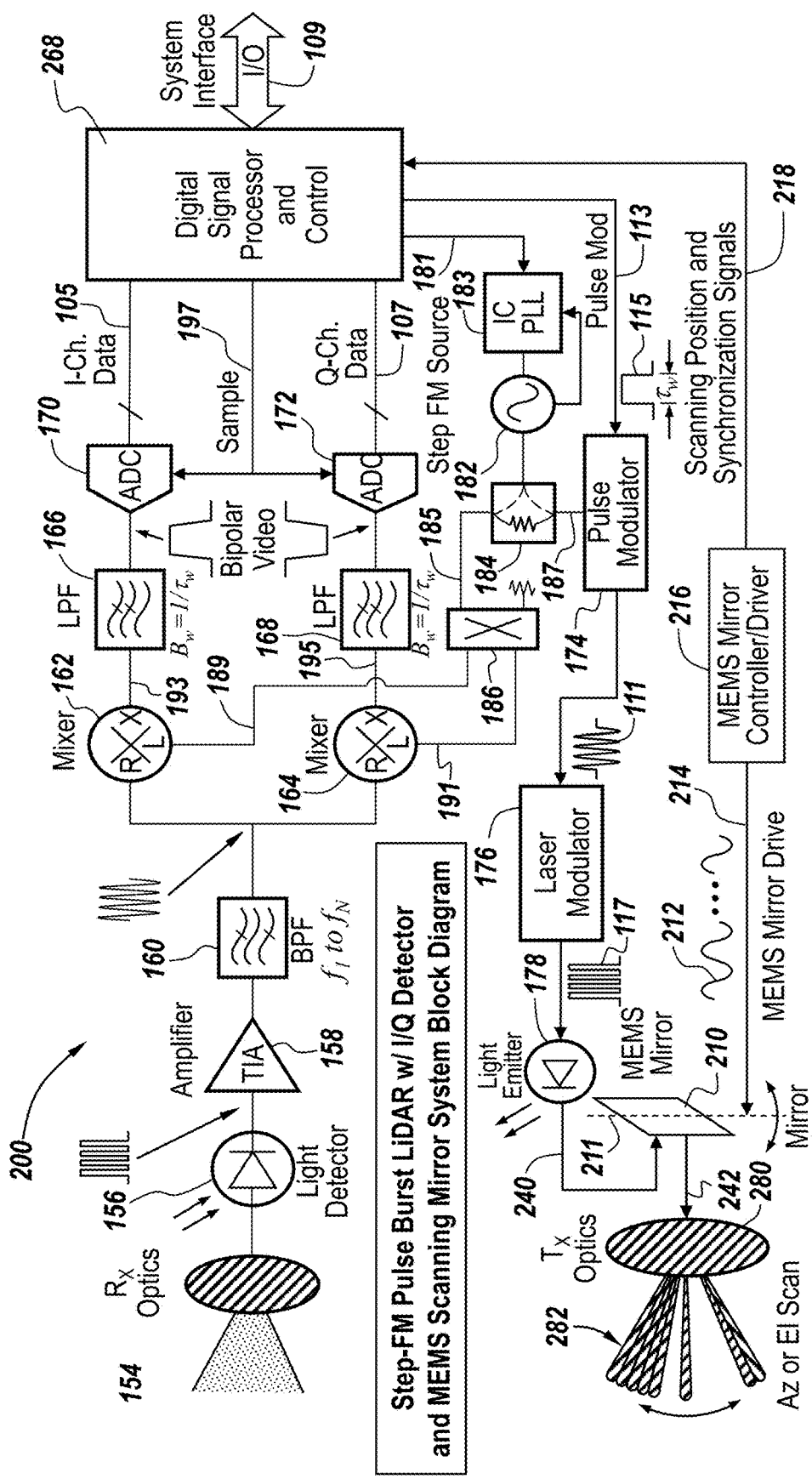
FIG. 14 includes a schematic functional block diagram which illustrates a LiDAR system using step-frequency-modulation (FM) pulse-burst transmit envelope modulation and quadrature demodulation and a MEMS scanning mirror, according to some exemplary embodiments.

FIG. 14 includes a schematic functional block diagram which illustrates a LiDAR system 200 using step-frequency-modulation (FM) pulse-burst transmit envelope modulation and quadrature demodulation and a MEMS scanning mirror, according to some exemplary embodiments. System 200 of FIG. 14 is identical to system 100 illustrated in FIG. 6A and described in detail above, with the exception of the addition of the MEMS scanning mirror capability. Like features between system 100 of FIG. 6A and system 200 of FIG. 14 are indicated by like reference numerals. Detailed description of features common to both system 100 of FIG. 6A and FIG. 200 of FIG. 14 will not be repeated.

Figure 15:
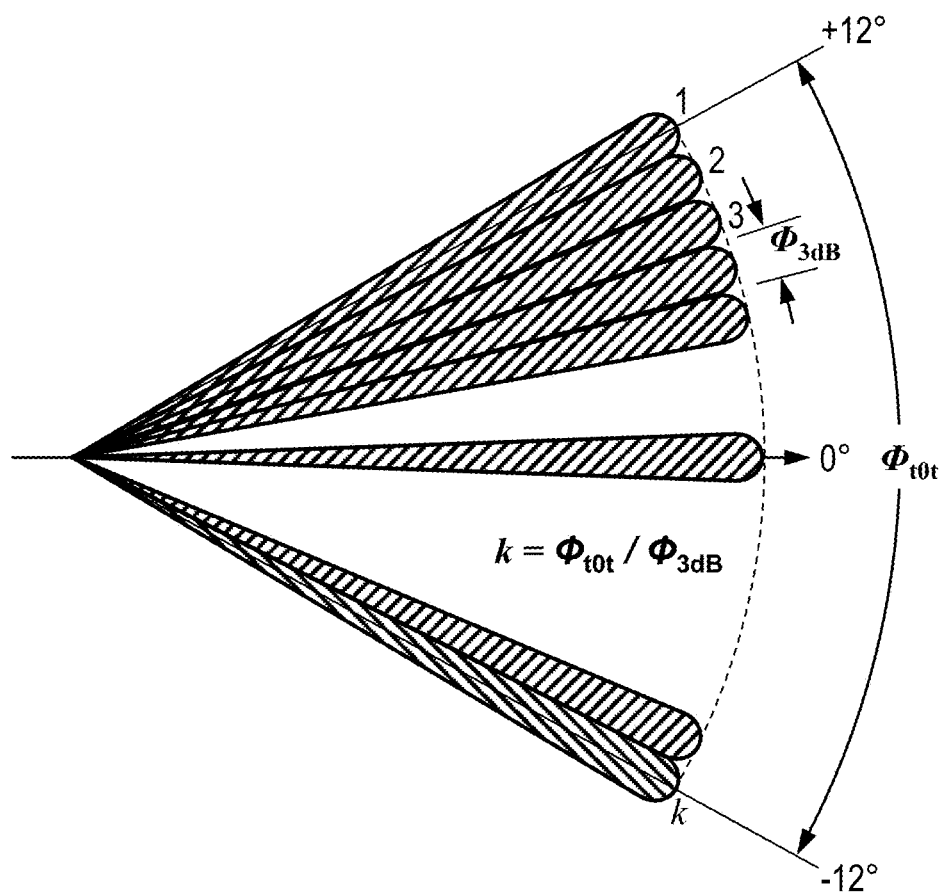
FIG. 15 includes a detailed schematic diagram illustrating MEMS scanning mirror transmit beam pattern as employed in the LiDAR system of FIG. 14, according to some exemplary embodiments.

FIG. 15 includes a detailed schematic diagram illustrating MEMS scanning mirror transmit beam pattern as employed in the LiDAR system 200 of FIG. 14, according to some exemplary embodiments. FIG. 15 schematically illustrates the transmit beam pattern 282 of MEMS scanning mirror 210, as processed via the transmit optics, according to exemplary embodiments. Referring to FIGS. 14 and 15, as noted above, system 200 is the same as system 100 of FIG. 6A, with the exception of the scanning mirror capability. In system 200, a MEMS mirror controller/driver 216 provides a mirror drive signal 212 to MEMS mirror 210 on line 214, which causes MEMS mirror 210 to rotate about an axis 211, which can be oriented to provide azimuthal or elevational rotation of MEMS mirror 210. As illustrated, signal mirror drive signal 212 can be substantially sinusoidal. MEMS scanning mirror 210 tilts to allow high-speed, controlled beam steering in LiDAR range and image applications, as well as a number of other optical systems. The narrow beamwidth, as represented in FIG. 15, and rapid azimuthal or elevational scanning of MEMS scanning mirror 210 are applicable to high bearing resolution scanning requirements. The step-FM pulse-burst envelope modulation waveform of the present disclosure is well suited to provide complementary high range-resolution and is compatible with the scan rate of MEMS mirror 210.

As described above in detail in connection with the embodiment of system 100 illustrated in FIG. 6A, the timing of pulses in the pulsed sinusoidal signal 111 is controlled by step-FM pulse-burst modulation signal 115 on output signal line 113 from DSPC 268. That is, step-FM pulse-burst modulation signal 115 is used by pulse modulator 174 to modulate substantially sinusoidal signal 187 to generate pulsed substantially sinusoidal signal 111. The resulting pulsed modulated signal 111 from pulse modulator 174 is applied as a modulation signal to a laser modulator 176, which generates a control/modulation signal 117, which is applied to light emitter 178 to generate a step-FM pulse-burst modulated optical signal. In system 200, the step-FM pulse-burst modulated optical signal is transmitted to MEMS mirror 210 along optical path 240, where it is reflected by MEMS mirror 210 along optical path 242 to transmit optics 280, by which the step-FM pulse-burst modulated optical signal is transmitted to the one or more target objects in the transmit beam pattern 282 of MEMS scanning mirror 210.

Figure 16:
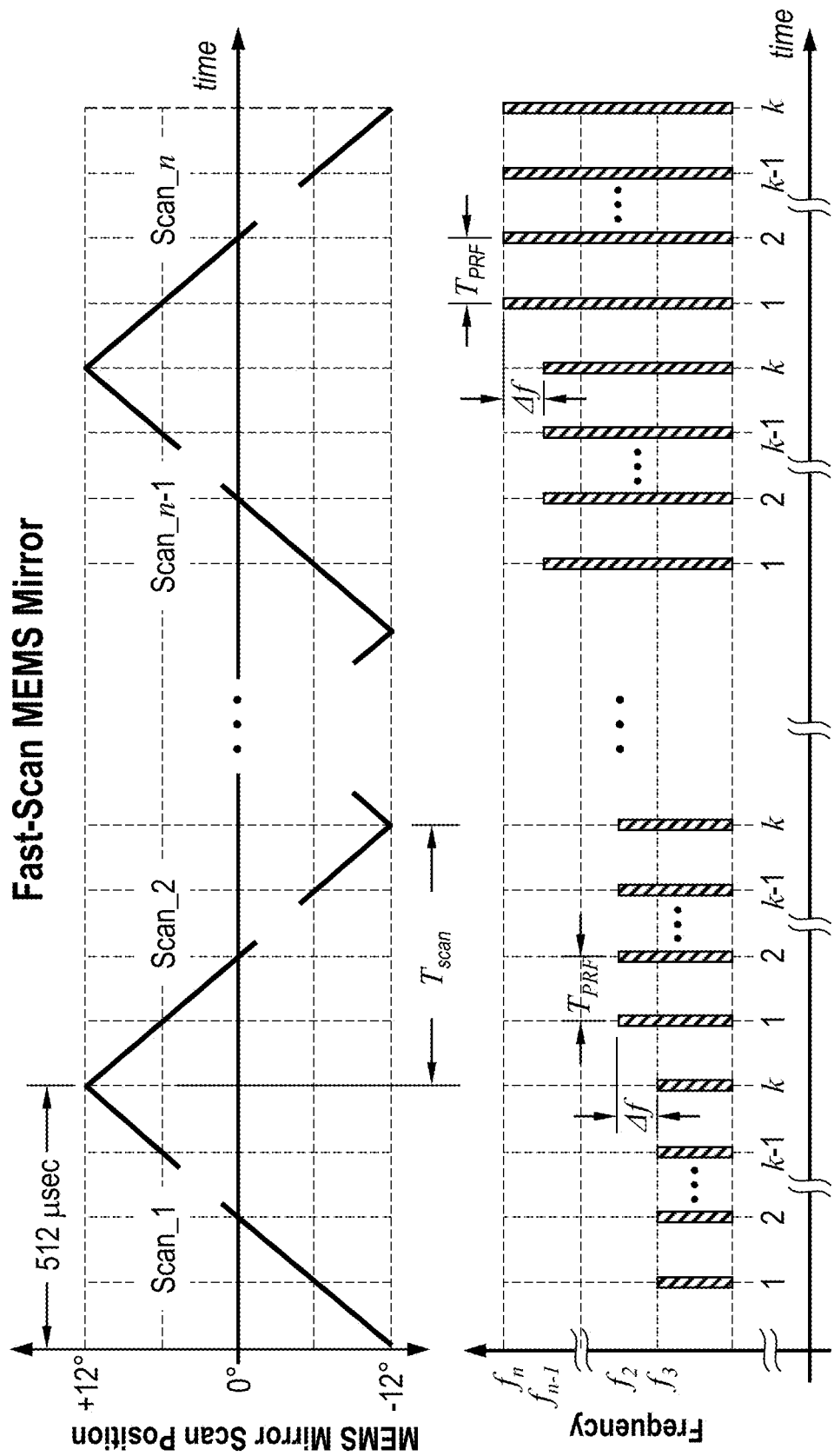
FIG. 16 includes schematic time diagrams illustrating the data acquisition process of the LiDAR system of FIGS. 14 and 15, utilizing a MEMS scanning mirror, according to some exemplary embodiments.

FIG. 16 includes schematic time diagrams illustrating the data acquisition process of LiDAR system 200 utilizing MEMS scanning mirror 210, according to exemplary embodiments. The top diagram in FIG. 15 illustrates the scan angle, i.e., angular position, of MEMS mirror 210 over time during data acquisition, and the bottom diagram illustrates the step-FM pulse-burst frequency over time during data acquisition. Referring to FIGS. 14 through 16, according to exemplary embodiments, a single, fixed-frequency, pulse-burst cluster is employed at each scan increment for the duration of each scan. The frequency of the fixed-frequency pulse-burst cluster increases by the step frequency, Δf, upon successive scans. Therefore, n scans are used to complete the data acquisition process, where n is the number of frequency steps. FIG. 15 illustrates the synchronization of the pulse burst frequency and the MEMS scanning mirror 210 angular position as scanning mirror 210 beam is scanned. According to exemplary embodiments, data is acquired for each beam position, i.e., scan increment, at each discrete frequency step. It will be noted that, in general, the MEMS mirror position is non-linear with time. However, in exemplary embodiments, via the process of synchronization of the MEMS mirror position with the pulse burst waveform, the effect engenders a linear or synchronized pulse burst relationship with the mirror position.

Figure 17:
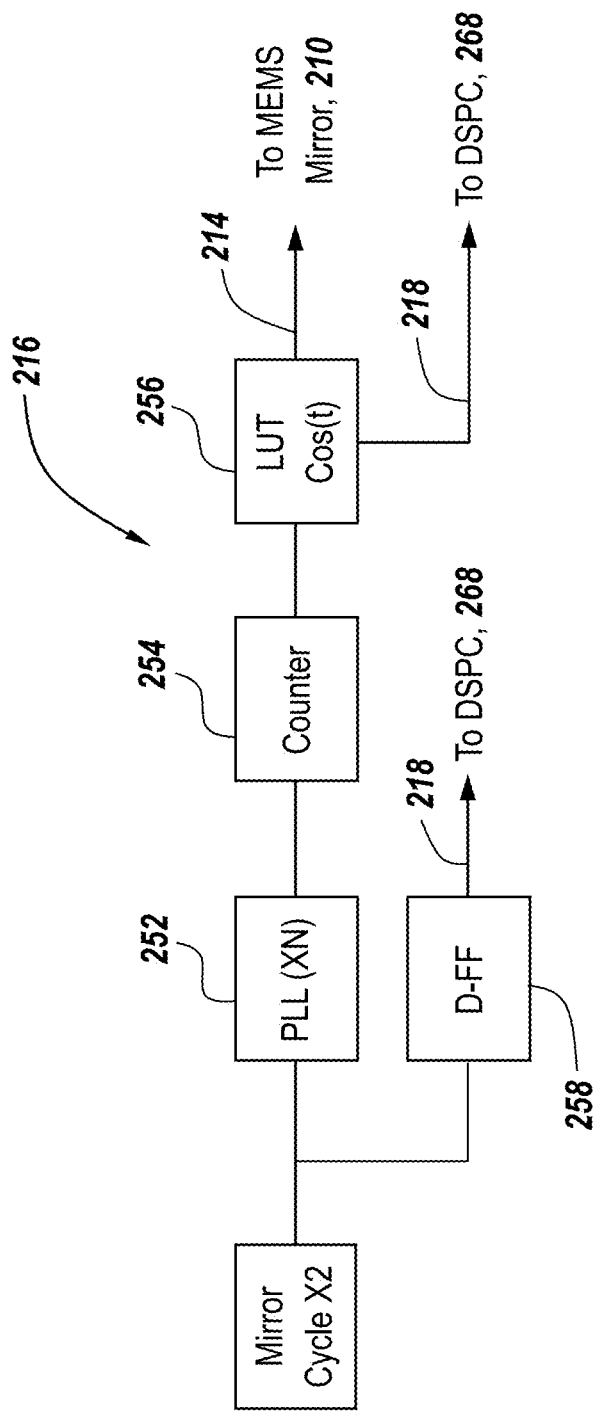
FIG. 17 includes a schematic detailed functional block diagram of a MEMS mirror controller/driver illustrated in FIG. 14, according to some exemplary embodiments.
Figure 18:
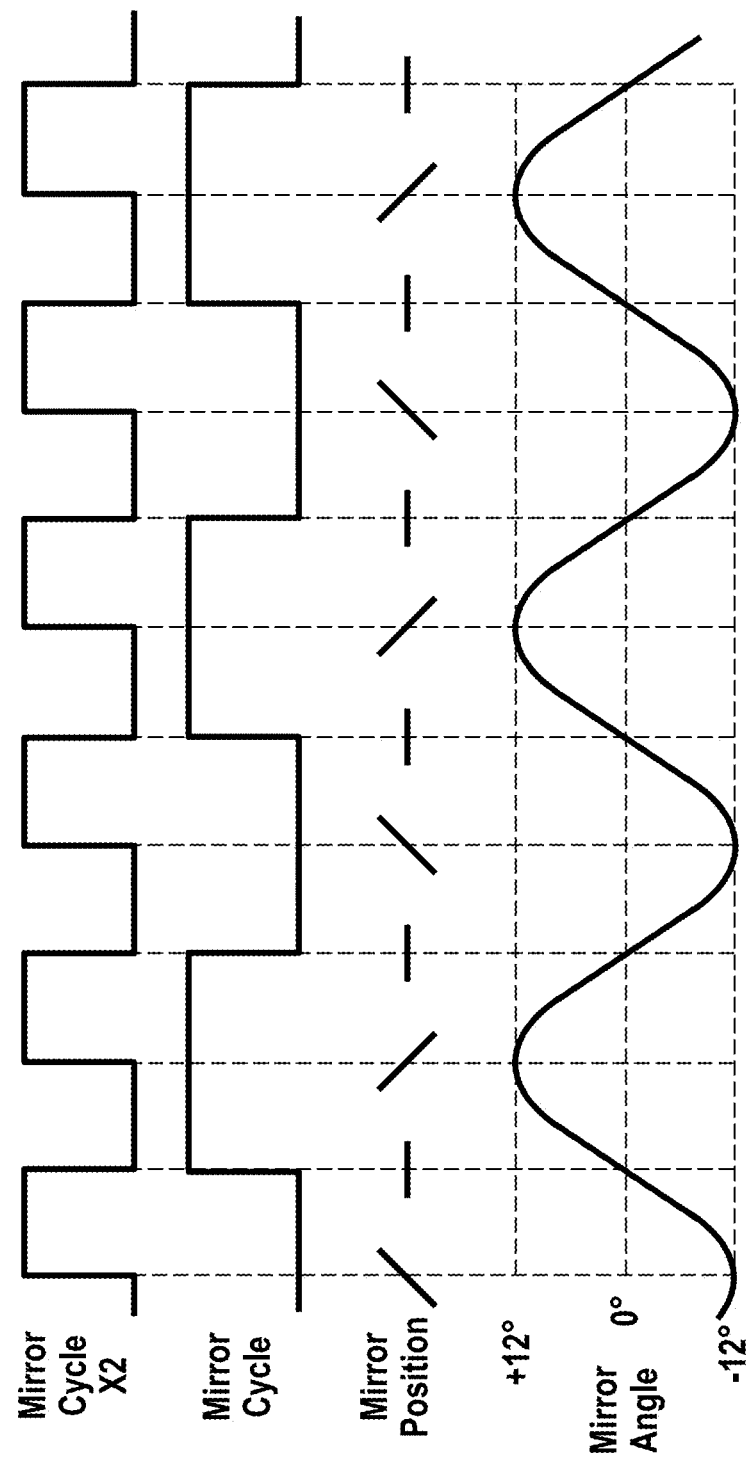
FIG. 18 includes a schematic time diagram illustrating synchronization of step-FM modulation pulses with scanning mirror position provided by MEMS the mirror controller/driver of FIGS. 14 and 17, according to some exemplary embodiments.
Figure 19A:
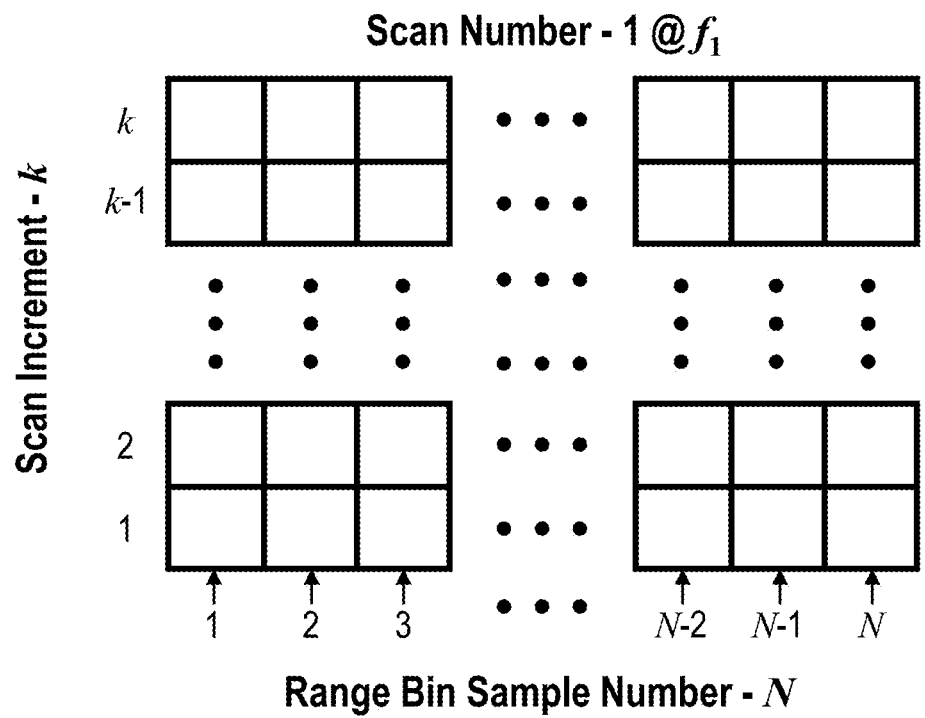
FIGS. 19A through 19D include a series of four illustrative data matrices for the scanning mirror data acquisition, according to some exemplary embodiments.
Figure 19B:
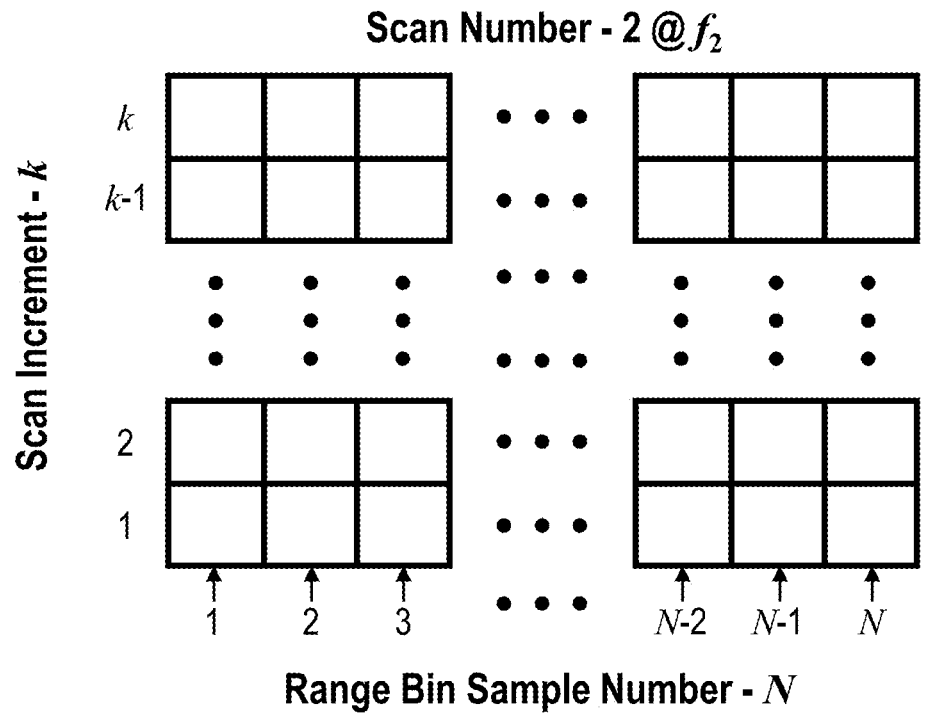
Figure 19C:
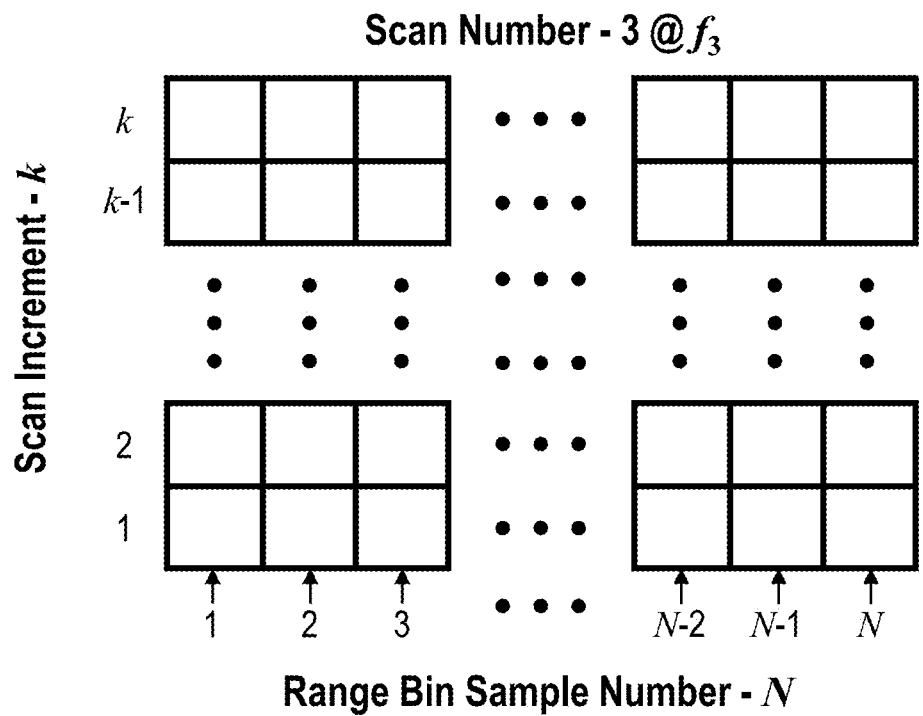
Figure 19D:
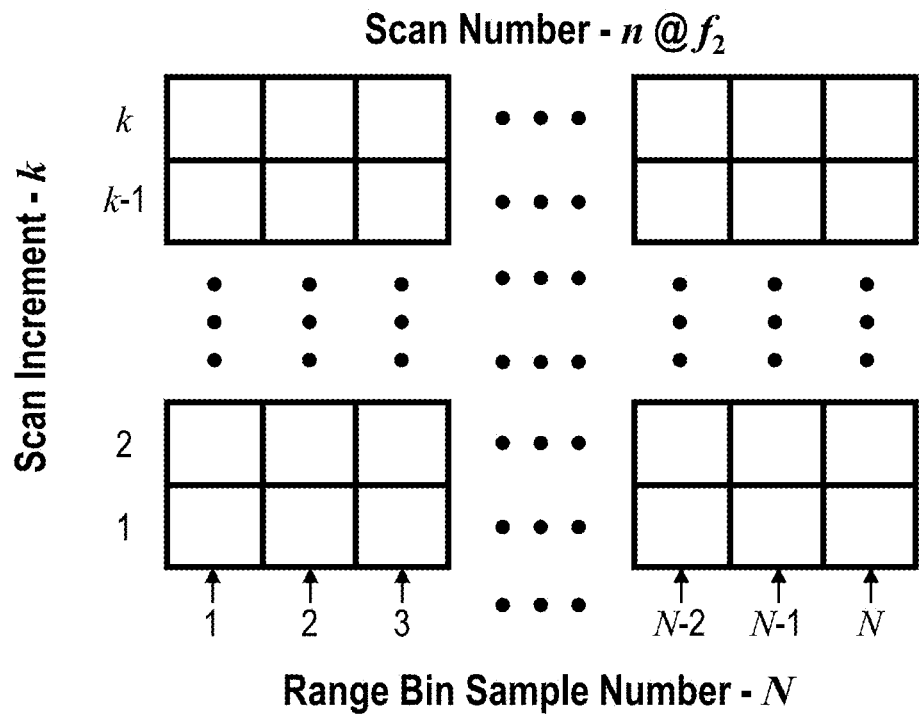

Continuing to refer to FIGS. 14 through 16, MEMS mirror controller/driver 216 provides synchronization of the pulses of step-FM pulse-burst modulation signal 115, and, as a result, the optical illumination pulses of the step-FM pulse-burst modulated optical signal, with the angular position of MEMS scanning mirror 210. FIG. 17 includes a schematic detailed functional block diagram of MEMS mirror controller/driver 216, according to some exemplary embodiments. FIG. 18 includes a schematic time diagram illustrating synchronization of the step-FM modulation pulses with scanning mirror position provided by MEMS mirror controller/driver 216, according to some exemplary embodiments.

Referring to FIGS. 14 through 18, digital signals Mirror Cycle X2 and Mirror Cycle are provided in MEMS mirror controller/driver 216. Mirror Cycle X2 turns high when the scan starts, which is when MEMS mirror 210 is at its maximum angle, which is illustrated as being ±12 degrees, by way of exemplary illustration only. It switches low again when MEMS mirror 210 is at its neutral or zero-degree position. Mirror Cycle can be used to determine whether mirror 210 moving to the left or right (in the case of azimuthal scanning) or up or down (in the case of elevational scanning). The rising and falling edges of the Mirror Cycle signal coincide with the zero crossings of MEMS mirror 210.

As noted above, to acquire data accurately at repeatable scanning mirror locations, synchronization between the scanning mirror position and the pulse burst transmission time is implemented, according to some exemplary embodiments. One technique for synchronization is to divide the time between the start and stop position scan signals into many smaller, equal-time increments which approximate the angular position of scanning mirror 210. The division may be accomplished with a phase-locked loop (PLL) 252 configured as a frequency multiplier. The output of the PLL frequency multiplier 252 is applied to a counter 254, which acts as a frequency divider. That is, counter 254 output value represents the time of the scan from which the angular position of mirror 210 may be calculated using a cosine function or determined from a look-up table (LUT), as illustrated by 256. The mirror direction is determined using a D-flip-flop 258 and the synchronized transmission pulse burst is thus generated. Thus, PLL 252 generates a clock from the Mirror Cycle X2 signal. For each scan, which can be either forward or reverse, a single pulse is generated in the Mirror Cycle X2 signal. PLL 252 is configured to divide this single pulse into, for example, 1024 shorter pulses, uniformly spaced in time. These pulses are routed to counter 254, the current value of which corresponds to the time of the scan. The angular position of scanning mirror 210 can be calculated using the cosine function or determined from a look-up table (LUT), as illustrated by 256. When combined with the single D flip-flop 258 to monitor the direction of mirror motion, the synchronized train of pulses 215 is generated by DSPC 268. To that end, the output of D-flip-flop is applied on lines 218 to DSPC 268, and the output of LUT/cosine function 256, indicative of mirror position, is also applied on lines 218 to DSPC 268. The mirror drive signal 212, also output from LUT/cosine function 256, is applied on lines 214 to MEMS scanning mirror 210 to control its rotation.

A potential anomaly exists with respect to samples acquired during the negative slope of the scan cycle. For example, in order to reconstruct the samples from the related scan increment, the FFT sample rate can be adjusted. For example, in some particular exemplary embodiments, the FFT sample rate can be adjusted to twice the scan time.

FIGS. 19A through 19D include a series of four illustrative data matrices for the scanning mirror data acquisition, according to some exemplary embodiments. FIG. 20 includes a table of parametric data in a typical automotive operational scenario of LiDAR system 100 using a MEMS scanning mirror for data acquisition, according to some particular exemplary embodiments. Referring to FIGS. 19A-19D and 20, the data acquisition process for the MEMS scanning mirror includes filling or populating n data matrices of dimension k×N; where n is the number of scans (also the number of frequency steps), k is the number of scan increments, and N is the number of range bin samples.

According to the present disclosure, laser transmitter step-FM pulse-burst envelope modulation and receiver quadrature demodulation techniques pursuant to direct detection LiDAR systems have been described in detail. Data acquisition techniques and signal processing gain have also been described in detail. According to the present disclosure, the technique of transmit envelope modulation in conjunction with receive quadrature demodulation as applied to direct detection LiDAR systems has been demonstrated to provide signal processing gain as determined by the increase in the signal-to-noise ratio at the system detection stage. Significant operational factors include the change in transmission phase shift of the envelope modulation waveform over the two-way range to the object, and coherent detection of the envelope modulation waveform within the quadrature demodulator. In addition, the envelope modulation waveform is derived from the quadrature demodulation local oscillator, thereby establishing the coherent signal required for detection.

The step-FM pulse burst envelope modulation waveform of the present disclosure has been demonstrated to be compatible with MEMS fast scanning mirror.

The achievement of signal processing gain in direct detection LiDAR systems far exceeds the modest increase in hardware complexity. The availability of integrated circuit phase-locked loop and quadrature demodulation functions assures ease of implementation with minimum impact to system volume, operating power and cost. Notably, the LiDAR architecture described herein in detail facilitates systems with lower transmit power, longer measurement range, reduced power consumption and potentially better performance in multiple system deployment conditions. Also, according to exemplary embodiments, due to the increase in signal-to-noise ratio, range measurement error or variance is reduced.

In some other exemplary embodiments, repetition of the data acquisition process to fill additional data matrices can provide simultaneous high resolution range and Doppler measurement.

Figure 21:
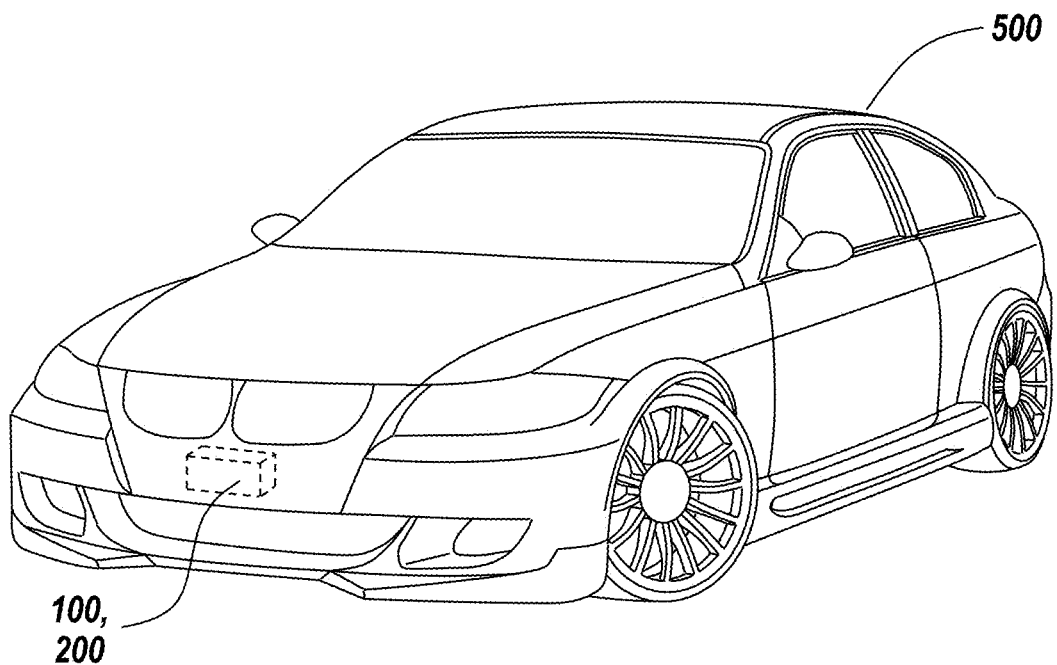
FIG. 21 includes a schematic perspective view of an automobile equipped with one or more LiDAR systems described herein in detail, according to some exemplary embodiments.

FIG. 21 includes a schematic perspective view of an automobile 500, equipped with one or more LiDAR systems 100, 200, described herein in detail, according to exemplary embodiments. Referring to FIG. 21, it should be noted that, although only a single LiDAR system 100, 200 is illustrated, it will be understood that multiple LiDAR systems 100, 200 according to the exemplary embodiments can be used in automobile 500. Also, for simplicity of illustration, LiDAR system 100, 200 is illustrated as being mounted on or in the front section of automobile 500. It will also be understood that one or more LiDAR systems 100, 200 can be mounted at various locations on automobile 500.

Figure 22:
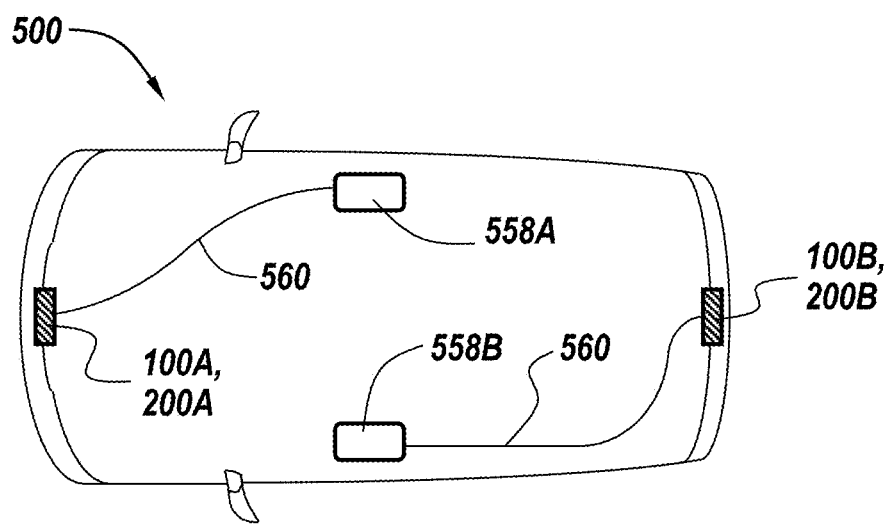
FIG. 22 includes a schematic top view of an automobile equipped with two LiDAR systems as described herein in detail, according to some exemplary embodiments.

FIG. 22 includes a schematic top view of automobile 500 equipped with two LiDAR systems 100, 200, as described above in detail, according to exemplary embodiments. In the particular embodiments illustrated in FIG. 22, a first LiDAR system 100A, 200A is connected via a bus 560, which in some embodiments can be a standard automotive controller area network (CAN) bus, to a first CAN bus electronic control unit (ECU) 558A. Detections generated by the LiDAR processing described herein in detail in LiDAR system 100A, 200A can be reported to ECU 558A, which processes the detections and can provide detection alerts via CAN bus 560. Similarly, in some exemplary embodiments, a second LiDAR system 100B, 20B is connected via CAN bus 560 to a second CAN bus electronic control unit (ECU) 558B. Detections generated by the LiDAR processing described herein in detail in LiDAR system 100B, 200B can be reported to ECU 558B, which processes the detections and can provide detection alerts via CAN bus 560. It should be noted that this configuration is exemplary only, and that many other automobile LiDAR configurations within automobile 500 can be implemented. For example, a single ECU can be used instead of multiple ECUs. Also, the separate ECUs can be omitted altogether.

It is noted that the present disclosure describes a LiDAR system installed in an automobile. It will be understood that the system of the disclosure is applicable to any kind of vehicle, e.g., bus, train, etc., or the LiDAR system of the present disclosure need not be associated with any kind of vehicle.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A direct detection LiDAR system, comprising:
a signal generator for generating an output signal having a variable frequency;
a modulation circuit for receiving the output signal from the signal generator and modulating the output signal to generate a pulsed modulation envelope signal configured to comprise a plurality of pulses, two or more of the plurality of pulses having two or more respective different frequencies, the modulation circuit further applying the pulsed modulation envelope signal to an optical signal to generate a pulse-envelope-modulated optical signal comprising a plurality of pulses modulated by the pulsed modulation envelope signal;
optical transmission elements for transmitting the pulse-envelope-modulated optical signal into a region;
optical receiving elements for receiving reflected optical signals from the region; and
receive signal processing circuitry for receiving the reflected optical signals and using quadrature detection to process the reflected optical signals, the receive signal processing circuitry comprising at least one light detection element which demodulates the reflected optical signals to recover a portion of a reflected version of the output signal from a reflected version of the pulse-envelope-modulated optical signal.

2. The direct detection LIDAR system of claim 1, wherein the modulation circuit comprises a pulse modulator for modulating the output signal to generate the pulsed envelope modulation signal.

3. The direct detection LIDAR system of claim 2, wherein the modulation circuit comprises a laser modulator for applying the pulsed modulation envelope signal to an optical signal to generate the pulse-envelope-modulated optical signal.

4. The direct detection LIDAR system of claim 1, wherein the modulation circuit comprises a laser modulator for applying the pulsed modulation envelope signal to an optical signal to generate the pulse-envelope-modulated optical signal.

5. The direct detection LiDAR system of claim 1, wherein the pulsed modulation envelope signal comprises two or more consecutive pulses at the same frequency.

6. The direct detection LiDAR system of claim 1, wherein the pulsed modulation envelope signal comprises one and only one pulse at each of a plurality of frequencies.

7. The direct detection LiDAR system of claim 1, wherein the optical receiving elements comprise a microelectromechanical systems (MEMS) scanning mirror for scanning the region to receive the reflected optical signals from the region.

8. The direct detection LiDAR system of claim 7, wherein the reflected optical signals from the region are received through a series of scans of the MEMS scanning mirror.

9. The direct detection LiDAR system of claim 8, wherein each of the series of scans provides receiver coverage over a field of view of the LiDAR system, each scan receiving reflected signals of a single frequency of the pulsed modulation envelope signal.

10. The direct detection LiDAR system of claim 1, wherein the two or more different frequencies increase with time.

11. The direct detection LiDAR system of claim 1, wherein the two or more different frequencies decrease with time.

12. The direct detection LiDAR system of claim 1, wherein the LiDAR system is installed and operates in an automobile.

* * * * *